US011501693B2

United States Patent
Kim et al.

(10) Patent No.: US 11,501,693 B2
(45) Date of Patent: Nov. 15, 2022

(54) ELECTRONIC APPARATUS TRANSMITTING POWER TO A DISPLAY APPARATUS, CONTROL METHOD THEREOF AND DISPLAY APPARATUS RECEIVING POWER

(71) Applicant: SAMSUNG ELECTRONICS CO., LTD., Suwon-si (KR)

(72) Inventors: Moonyoung Kim, Suwon-si (KR); Jeongil Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/898,828

(22) Filed: Jun. 11, 2020

(65) Prior Publication Data

US 2021/0020096 A1 Jan. 21, 2021

(30) Foreign Application Priority Data

Jul. 17, 2019 (KR) .......................... 10-2019-0086240

(51) Int. Cl.
*G06F 3/038* (2013.01)
*G09G 3/32* (2016.01)

(52) U.S. Cl.
CPC ............ *G09G 3/32* (2013.01); *G09G 2310/06* (2013.01); *G09G 2330/027* (2013.01); *G09G 2330/04* (2013.01); *G09G 2370/04* (2013.01)

(58) Field of Classification Search
CPC ................. G09G 3/32; G09G 2310/06; G09G 2330/027; G09G 2330/04

(Continued)

(56) References Cited

U.S. PATENT DOCUMENTS 4,626,977 A 12/1986 Carnes et al.
5,499,184 A 3/1996 Squibb
(Continued)

FOREIGN PATENT DOCUMENTS

CN 201601359 10/2010
EP 2 610 843 7/2013
(Continued)

OTHER PUBLICATIONS

International Search Report and Written Opinion dated Dec. 18, 2019 in counterpart International Application No. PCT/KR2019/011323, 7 pages.

(Continued)

*Primary Examiner* — Jonathan M Blancha
(74) *Attorney, Agent, or Firm* — Nixon & Vanderhye P.C.

(57) ABSTRACT

An electronic apparatus is disclosed. The electronic apparatus includes: a power interface comprising circuitry connected with a display apparatus, a first converter comprising circuitry configured to convert an external power to a first driving power based on a first ground, a second converter comprising circuitry configured to convert the external power to a second driving power, based on a second ground, the second driving power having a voltage level lower than a voltage level of the first driving power, and a switch having a first end connected to an output end of the first converter, and the switch is connected to a power interface by one of the first end and a second end, wherein the switch is configured to be switched to supply one of the first driving power and the second driving power to the display apparatus through the power interface based on an operating state of the display apparatus.

16 Claims, 31 Drawing Sheets

(58) Field of Classification Search
USPC .......................................................... 345/208
See application file for complete search history.

(56) References Cited

U.S. PATENT DOCUMENTS

| | | | |
|---|---|---|---|
| 5,671,131 | A | 9/1997 | Brown |
| 5,886,425 | A * | 3/1999 | Shin .................. H02J 9/061 |
| | | | 257/725 |
| 6,021,499 | A | 2/2000 | Aleshi |
| 6,515,379 | B1 * | 2/2003 | Nojima ................ H02M 1/10 |
| | | | 307/64 |
| 7,541,691 | B2 | 6/2009 | Lee et al. |
| 8,164,932 | B2 | 4/2012 | Sims et al. |
| 8,867,947 | B2 | 10/2014 | Yamazawa |
| 9,391,454 | B2 | 7/2016 | Hsu |
| 9,444,251 | B2 | 9/2016 | Woo et al. |
| 9,716,466 | B2 | 7/2017 | Han et al. |
| 9,735,692 | B1 | 8/2017 | Lu et al. |
| 9,906,071 | B2 | 2/2018 | Kim |
| 10,749,364 | B2 | 8/2020 | Dai |
| 2005/0105304 | A1* | 5/2005 | Niemand ............. H02M 3/28 |
| | | | 363/21.01 |
| 2006/0145630 | A1 | 7/2006 | Jeon |
| 2006/0214599 | A1 | 9/2006 | Ogawa |
| 2006/0288139 | A1 | 12/2006 | Lee et al. |
| 2008/0007926 | A1 | 1/2008 | Lee et al. |
| 2009/0002901 | A1 | 1/2009 | Matsumoto et al. |
| 2009/0085576 | A1 | 4/2009 | Lenzie et al. |
| 2010/0045590 | A1 | 2/2010 | Kumamoto et al. |
| 2011/0128153 | A1 | 6/2011 | Sims et al. |
| 2012/0256489 | A1* | 10/2012 | Perper .................. H02J 5/00 |
| | | | 307/140 |
| 2013/0169612 | A1* | 7/2013 | Woo .................. H02M 1/4208 |
| | | | 307/66 |
| 2014/0254994 | A1 | 9/2014 | Cho et al. |
| 2014/0354579 | A1 | 12/2014 | Paskalev et al. |
| 2014/0368179 | A1 | 12/2014 | Lee et al. |
| 2015/0185791 | A1 | 7/2015 | Hall |
| 2015/0188429 | A1* | 7/2015 | Taya .................. H04B 1/1607 |
| | | | 455/127.1 |
| 2015/0207456 | A1 | 7/2015 | Han et al. |
| 2016/0141951 | A1 | 5/2016 | Mao et al. |
| 2016/0189602 | A1 | 6/2016 | Yang |
| 2016/0196803 | A1 | 7/2016 | Reynolds et al. |
| 2017/0006688 | A1 | 1/2017 | Dai et al. |
| 2017/0093158 | A1 | 3/2017 | Perper et al. |
| 2017/0278658 | A1 | 9/2017 | Kang |
| 2017/0310224 | A1 | 10/2017 | Joo et al. |
| 2017/0357366 | A1 | 12/2017 | Lee et al. |
| 2018/0019681 | A1 | 1/2018 | Fouque et al. |
| 2018/0269701 | A1 | 9/2018 | Dai |
| 2019/0114969 | A1 | 4/2019 | Hong |
| 2019/0157910 | A1 | 5/2019 | Choi et al. |
| 2019/0334373 | A1 | 10/2019 | Jang et al. |
| 2020/0083816 | A1 | 3/2020 | Kim et al. |

FOREIGN PATENT DOCUMENTS

| | | |
|---|---|---|
| EP | 3270584 | 1/2018 |
| EP | 3451493 | 3/2019 |
| JP | H09-331410 | 12/1997 |
| JP | 10-171404 | 6/1998 |
| JP | 2006-238676 | 9/2006 |
| JP | 2009-130423 | 6/2009 |
| JP | 5331219 | 10/2013 |
| JP | 5640491 B2 | 12/2014 |
| KR | 10-0315771 | 11/2001 |
| KR | 10-2008-0110376 | 12/2008 |
| KR | 10-1124042 | 3/2012 |
| KR | 10-2015-0072508 | 6/2015 |
| KR | 10-2015-0088132 | 7/2015 |
| KR | 10-2016-0125732 A | 11/2016 |
| KR | 10-2017-0025197 | 3/2017 |
| KR | 10-2018-0009175 | 1/2018 |
| KR | 10-2018-0012503 | 2/2018 |
| KR | 10-1925142 | 2/2019 |
| KR | 10-2019-0063569 | 6/2019 |
| KR | 10-2020-0030407 | 3/2020 |
| WO | 2017/084528 | 5/2017 |
| WO | 2018/016751 | 1/2018 |
| WO | 2018/139802 | 8/2018 |

OTHER PUBLICATIONS

Extended Search Report dated Dec. 13, 2019 in counterpart European Patent Application No. 19195578.0., 15 pages.
"Designing Multiple Output Flyback Power Supplies," Jan. 1, 2001, retrieved from the internet: url:https://piexpertonline.power.com/help/piexpert/en/index.htm#topics/appendixa.htm, 7 pages [retrieved Dec. 4, 2019].
Non-final Office Action for U.S. Appl. No. 16/558,406, dated Apr. 1, 2019, 19 pages.
Final Office Action dated Mar. 8, 2021 in U.S. Appl. No. 16/558,406.
Examination Report dated Apr. 16, 2021 in corresponding European Patent Application No. 20179422.9.
Examination Report dated Apr. 28, 2021 in corresponding European Patent Application No. 19195578.0.
Search Report and Written Opinion dated Sep. 21, 2020 in counterpart International Patent Application No. PCT/KR2020/007509.
Final Office Action dated Jul. 14, 2020 in U.S. Appl. No. 16/558,406.
European Search Report and Written Opinion dated Nov. 6, 2020 in corresponding Application No. 20179422.9.
U.S. Office Action dated Nov. 23, 2020 in U.S. Appl. No. 16/558,406.
Notice of Allowance for U.S. Appl. No. 16/558,406 dated Sep. 8, 2021; Kim; 11 pgs.
U.S. Office Action dated May 27, 2021 in U.S. Appl. No. 16/558,406.

* cited by examiner

ELECTRONIC APPARATUS TRANSMITTING POWER TO A DISPLAY APPARATUS, CONTROL METHOD THEREOF AND DISPLAY APPARATUS RECEIVING POWER

CROSS-REFERENCE TO RELATED APPLICATION

This application is based on and claims priority under 35 U.S.C. § 119 to Korean Patent Application No. 10-2019-0086240, filed on Jul. 17, 2019, in the Korean Intellectual Property Office, the disclosure of which is incorporated by reference herein in its entirety.

BACKGROUND

1. Field

The disclosure relates to an electronic apparatus, a control method thereof, and a display apparatus, for example to an electronic apparatus transmitting and receiving power, a control method thereof and a display apparatus.

2. Description of Related Art

An adaptor may transfer wall power to an electronic device connected through a cable. If the electronic device requires high power consumption, the current may increase and the cable may also become thicker accordingly. In this case, by designing an output of the adaptor to a high voltage output, the size of the current may be reduced and may be highly advantageous in selecting the length and thickness of the cable.

However, electronic products such as a television (TV) requires a constant standby power, and if the output voltage of the adaptor is high, the efficiency in a standby mode with a small load would be poor making it difficult to meet a standby power regulation. Accordingly, conventionally, an adaptor provided with a high voltage converter and a low voltage converter (e.g., standby mode converter) as in the left side of FIG. 1 has been used, and the adaptor may drive one of the high voltage converter and the low voltage converter based on the power consumption required by the electronic device in the right side of FIG. 1 to provide power to the electronic device.

For example, if the electronic device is in standby mode, the adaptor may turn-off the high voltage converter, operate the low voltage converter to supply standby power to the electronic device, and if the electronic device is operated in a normal mode requiring high power consumption, the high voltage converter may be operated to supply high voltage power to the electronic device. A power board in the electronic device that received the high voltage may supply power in voltage form required by the electronic device. In general, the low voltage converter and the high voltage converter have different ground (GND) from each other.

In this structure, several strands of wire in the cable may be required, and because the several wire strands require isolation from one another, the several wire strands including wiring covers have a problem of thickening the overall thickness of the adaptor cable. That is, because the wire for high voltage and the wire for low voltage are separately provided, there are problems in that the thickness of the cable becomes thicker.

SUMMARY

Embodiments of the disclosure provide an electronic apparatus for thinning a power cable connected between an electronic apparatus and a display apparatus, a control method thereof and a display apparatus.

According to an example embodiment, an electronic apparatus includes: a power interface connected to a display apparatus, a first converter comprising circuitry configured to convert an external power to a first driving power based on a first ground, a second converter comprising circuitry configured to convert the external power to a second driving power, based on a second ground, the second driving power having a voltage level less than the first driving power, and a switch having one end connected to an output end of the first converter and another end connected to an output end of the second converter, wherein the switch is configured to switch one of the first driving power and the second driving power to the display apparatus through the power interface based on an operating state of the display apparatus.

The first converter may be further configured to turn-on based on the display apparatus being in a first operating state and to output the first driving power, and to turn-off based on the display apparatus being in a second operating state, wherein the second converter is configured to turn-off based on the display apparatus being in the first operating state, and to turn-on based on the display apparatus being in the second operating state to output the second driving power.

The switch may be further configured to be open for the first driving power to be supplied to the display apparatus through the power interface based on the display apparatus being in the first operating state, and to be closed for the second driving power to be supplied to the display apparatus through the power interface based on the display apparatus being in the second operating state.

The first operating state may be a state in which the display apparatus operates in a normal mode, and the second operating state may be a state in which the display apparatus operates in a standby mode.

The electronic apparatus may further comprise a diode, wherein an output end of the first converter comprises a first node connected to the first ground and a second node connected to a cathode of the diode, and wherein an output end of the second converter comprises a third node connected to the second ground and a fourth node connected to an anode of the diode.

The second ground may be an earth ground, and wherein the first ground may be a ground different from the earth ground.

The electronic apparatus may further comprise a communication interface comprising circuitry connected with the display apparatus, wherein the electronic apparatus receives information on an operating state of the display apparatus through the communication interface.

According to an example embodiment, a display apparatus includes: a power interface connected to an electronic apparatus, a main circuit, a power circuit configured to turn-on based on the display apparatus being in a first operating state to supply a first driving power through the power interface to the main circuit, and to turn-off based on the display apparatus being in a second operating state; and a switching circuit configured to turn off based on the display apparatus being in the first opening state to supply a second driving power through the power interface to the main circuit based on the display apparatus being in a second operating state.

The display apparatus may further comprise a communication interface comprising circuitry connected with the electronic apparatus, wherein the main circuit is configured to transmit information on an operating state of the display apparatus to the electronic apparatus through the communication interface.

The switching circuit may be further configured to be open between the power interface and the main circuit based on the first driving power being provided through the power interface, and to close between the power interface and the main circuit to provide the second driving power to the main circuit based on the second driving power being provided through the power interface.

The switching circuit may be further configured to open circuit between the power interface and the main circuit based on a signal indicating the display apparatus is in the first operating state being received from the main circuit, and short circuit between the power interface and the main circuit for the second driving power to be provided to the main circuit based on a signal indicating the display apparatus is in the second driving state being received from the main circuit.

The switching circuit may further comprise a protection circuit configured to block the driving power based on the driving power provided to the main circuit exceeding a threshold value.

The second driving power may be a power based on an earth ground, and the first driving power may be a power based on a ground different from the earth ground.

According to an embodiment, a method of controlling an electronic apparatus includes: receiving an operating state of a display apparatus, based on the operating state, converting an external power using a first converter to a first driving power based on a first ground or converting the external power to a second driving power, based on a second ground, having a voltage lower than the first driving power using the second converter, and switching based on the operating state to supply the converted driving power to the display apparatus through a power interface connected to one end of the switch.

The converting may comprise turning-on the first converter based on the display apparatus being in a first operating state to output the first driving power, and turning-off the second converter; and turning-off the first converter based on the display apparatus being in a second operating state, and turning-on the second converter to output the second driving power.

The supplying may comprise opening the switch for the first driving power to be supplied to the display apparatus through the power interface based on the display apparatus being in the first operating state, and closing the switch for the second driving power to be supplied to the display apparatus through the power interface based on the display apparatus being in the second operating state.

The first operating state may be a state in which the display apparatus operates in a normal mode, and the second operating state may be a state in which the display apparatus operates in a standby mode.

The supplying may comprise connecting a cathode of a diode to the output end of the first converter, and blocking the first driving power from being supplied to the second converter by an anode through a diode connected to the output end of the second converter.

The second ground may be an earth ground, and the first ground may be a ground different from the earth ground.

The method may further comprise receiving information on an operating state of the display apparatus through a communication interface.

According to various example embodiments, the electronic apparatus may use one power cable to provide power of a high voltage or a low voltage to the display apparatus, and the power cable connecting the electronic apparatus and the display apparatus may be realized to be thinner.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
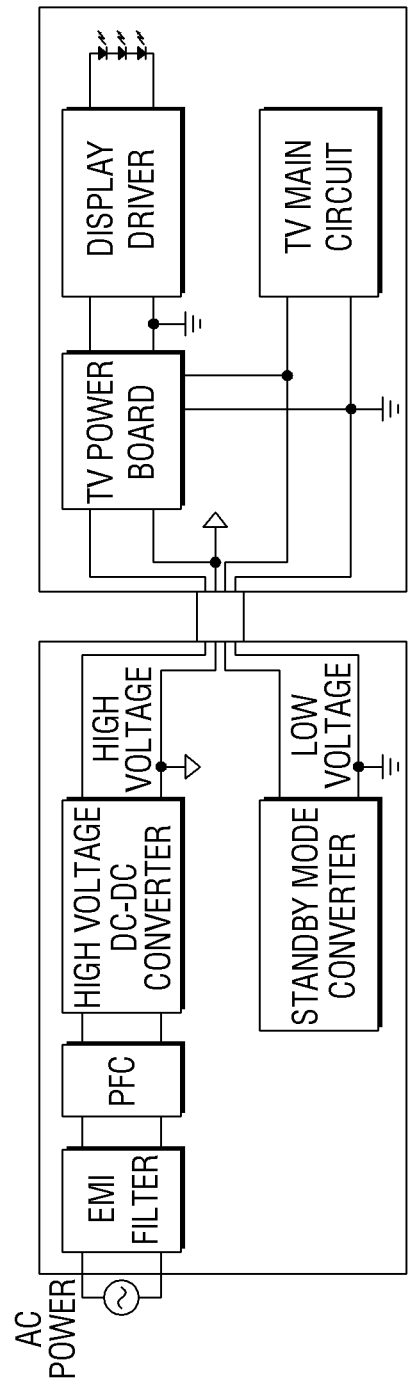
FIG. 1 is a diagram illustrating an adaptor and a cable according to conventional technology.

The various example embodiments of the present disclosure may be diversely modified. Accordingly, various example embodiments are illustrated in the drawings and are described in greater detail in the disclosure. However, it is to be understood that the disclosure is not limited to a specific example embodiment, but includes all modifications, equivalents, and substitutions without departing from the scope and spirit of the present disclosure. Also, well-known functions or constructions may not described in detail where they would obscure the disclosure with unnecessary detail.

Various example embodiments of the disclosure will be described in greater detail below with reference to the accompanying drawings.

Figure 2:
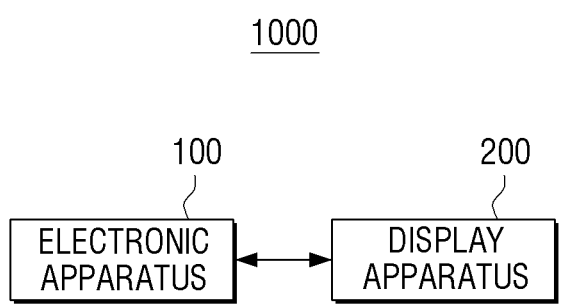
FIG. 2 is a block diagram illustrating an example configuration of an electronic system according to an embodiment of the disclosure.

FIG. 2 is a block diagram illustrating an example configuration of an electronic system 1000 according to an embodiment of the disclosure. As illustrated in FIG. 2, the electronic system 1000 may include an electronic apparatus 100 and a display apparatus 200.

The electronic apparatus 100 may supply power to the display apparatus 200. For example, the electronic apparatus 100 may, for example, include an adaptor or the like, convert external power to a power for driving the display apparatus 200, and provide the converted power to the display apparatus 200. For example, the electronic apparatus 100 may provide power of different voltage levels based on an operating state of the display apparatus 200.

The electronic apparatus 100 may not only supply power but also provide content to the display apparatus 200. For example, the electronic apparatus 100 may include, an arrangement similar to a one connect box, or the like, and not only supply power but also transmit content to the display apparatus 200. The content may, for example, be content that is stored in the electronic apparatus 100 or content that is received externally.

The electronic apparatus 100 may be connected to the display apparatus 200 via a cable, and the cable may include a wire for supplying power. For example, the electronic apparatus 100 may supply power of different voltage levels through a same wire based on an operating state of the display apparatus 200. Conventionally, cable thickness has increased as power of different voltage levels have been provided through a plurality of wires respectively. However, the disclosure provides power of different voltage levels through one wire based on an operating state of the display apparatus 200, and accordingly, the thickness of the cable may be reduced compared to that of conventional cables.

The cable may further include a wire for communication. For example, the cable may further include an optical cable for communication, and the electronic apparatus 100 may provide content to the display apparatus 200 through the optical cable and the display apparatus 200 may provide information on an operating state of the display apparatus 200 to the electronic apparatus 100 through the optical cable. However, the disclosure is not limited thereto, and the electronic apparatus 100 may provide content to the display apparatus 200 through wireless communication and the display apparatus 200 may provide information on an operating state of the display apparatus 200 to the electronic apparatus 100 through wireless communication or any other suitable type of communication.

The display apparatus 200 may, for example, be an apparatus driven by being supplied power from the electronic apparatus 100. For example, the display apparatus 200 may include an apparatus, such as, for example, and without limitation, a television (TV) and monitor, operating at one of a normal mode, a standby mode, and an ambient mode. The TV may include, for example, and without limitation, a light emitting diode (LED) TV, a quantum dot light emitting diode (QLED) TV, an organic light emitting diode (OLED) TV, a micro LED TV, and the like. However, the disclosure is not limited thereto, and may be any apparatus even though a display is not provided if the apparatus operable in a normal mode or a standby mode. The normal mode herein may refer, for example, to a state the apparatus operates without specific limitation, and the standby mode may refer, for example, to a state the apparatus operates by providing a minimum and/or reduced function. For example, the TV may operate in a normal mode displaying content or operate at a standby mode capable of receiving a signal from a remote control apparatus though not providing content.

The display apparatus 200 may provide an operating state of the display apparatus 200 to the electronic apparatus 200, and receive power corresponding to the operating state of the display apparatus 200 from the electronic apparatus 100.

As described above, the electronic apparatus 100 may supply power to the display apparatus 200 using a cable having a thickness less than that of conventional cables. The operations of each of the apparatuses will be described with reference to operating methods thereof.

Figure 3:
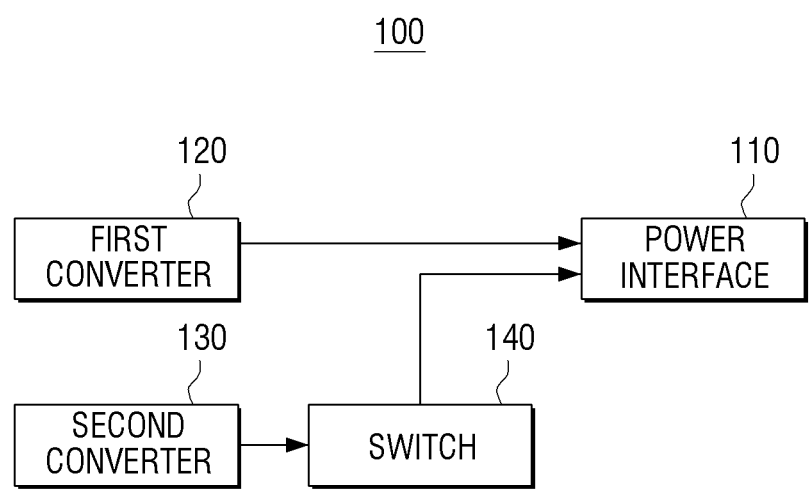
FIG. 3 is a block diagram illustrating an example configuration of an electronic apparatus according to an embodiment of the disclosure.

FIG. 3 is a block diagram illustrating an example configuration of an electronic apparatus 100 according to an embodiment of the disclosure.

Referring to FIG. 3, the electronic apparatus 100 may include a power interface (e.g., including power interface circuitry) 110, a first converter 120, a second converter 130, and a switch 140.

The power interface 110 may include various circuitry and connect with the display apparatus 200 through a cable. The electronic apparatus 100 may supply power to the display apparatus 200 through the power interface 110 and the cable.

The first converter 120 may include various circuitry and convert an external power to a first driving power based on a first ground. For example, the first converter 120 may convert the external power to a first driving power based on ground that is different from earth ground, and supply the first driving power to the display apparatus 200 through the power interface 110.

The first converter 120 may be turned on to output the first driving power if the display apparatus 200 is in a first operating state and turned off to suspend the converting operation to the first driving power if the display apparatus 200 is in a second operating state.

The external power may, for example, be power which is a converted form of commercial power (e.g., 90 to 264 Vac) supplied externally of the electronic apparatus 100 that has passed through an electromagnetic interference (EMI) filter and a power factor correction (PFC) circuit. The EMI filter may rectify and smooth commercial power to output to a direct current (DC) power of a predetermined level. A half-wave or a full-wave rectifying circuit may be used for rectification, and a capacitor may be connected to the output end of the rectifying circuit in parallel for smoothing. The PFC circuit may satisfy a PF regulation of the electronic device by cancelling a reactive power amount.

The second converter 130 may include various circuitry and convert the external power based on the second ground to the second driving power of a voltage level lower (e.g., less) than the first driving power. For example, the second converter 130 may include various circuitry and convert the external power to the second driving power based on the earth ground, and may supply the second driving power to the display apparatus 200 through the power interface 110.

The second converter 130 may be turned-off if the display apparatus 200 is in a first operating state, and the display apparatus 200 may be turned-on if in a second operating state to output the second driving power.

The external power may include power which is a converted form of commercial power supplied externally of the electronic apparatus 100 that has passed through the EMI filter. The second converter 130 may be turned-on if the display apparatus 200 is in the second operating state, and in this case, may also be turned-off by the PFC circuit. Accordingly, although power is not consumed at the PFC circuit, the variability of power inputted to the second converter 130 may be greater than the power inputted to the first converter 120.

However, the disclosure is not limited thereto, and the display apparatus 200 may be maintained with the PFC circuit turned-on even when in the second operating state. However, power consumption may be increased in this case when the PFC circuit is turned-off. For convenience of description, the PFC circuit being turned-on or turned-off based on the operating state of the display apparatus 200 will be described in greater detail below.

The switch 140 may, for example, have one end connected to the output end of the first converter 120 and the other end to be connected to the output end of the second converter 130. Further, the switch 140 may switch between one of the one end or the other end to be connected to the power interface 110 and one of the first driving power and the second driving power to be supplied to the display apparatus 200 through the power interface 110 based on the operating state of the display apparatus 200. The switch 140 may disconnect the ground of the first converter 120 and the second converter 130.

For example, the switch 140 may be open circuited (e.g., open) for the first driving power to be supplied to the display apparatus 200 through the power interface 110 when the display apparatus 200 is in the first operating state, and short circuited (e.g., closed) for the second driving power to be supplied to the display apparatus 200 through the power interface 110 when the display apparatus 200 is in the second operating state. However, it will be understood that the disclosure is not limited to this example, and any suitable operation of the switch may be used.

The first operating state may be a state in which the display apparatus 200 operates in a normal mode, and the second operating state may be a state in which the display apparatus 200 operates in a standby mode.

The electronic apparatus 100 may further include a communication interface (e.g., including communication circuitry) connected with the display apparatus 200, and the electronic apparatus 100 may receive information on the operating state of the display apparatus 200 through the communication interface. The communication interface of the electronic apparatus 100 may include various communication circuitry and be connected with the display apparatus 200 via, for example, an optical cable to perform communication with the display apparatus 200. However, the disclosure is not limited thereto, and the communication interface may any suitable interface, including, for example, and without limitation, one or more of a high definition multimedia interface (HDMI), a mobile high-definition link (MHL), a universal serial bus (USB), a display port (DP), a Thunderbolt, a video graphics array (VGA) port, a RGB port, a D-subminiature (D-SUB), a digital visual interface (DVI), or the like, and may be any standard interface where data communication is possible.

The information on the operating state of the display apparatus 200 may be provided to the PFC circuit, the first converter 120, the second converter 130, and the switch 140, and the PFC circuit, the first converter 120, the second converter 130, and the switch 140 may be turned-on or turned-off based on information on the operating state of the display apparatus 200.

The cable may include a first wire connected with the power interface 110, a ground line, and a second wire connected with the communication interface. The first wire, the ground line, and the second wire in the cable may be in an isolated state from one another.

However, the embodiment is not limited thereto, and the electronic apparatus 100 may perform communication with the display apparatus 200 wirelessly to receive information on the operating state of the display apparatus 200. For example, the electronic apparatus 100 may include, for example, and without limitation, at least one of a Wi-Fi module, a Bluetooth module, a wireless communication module, or the like, each module including various circuitry, and may receive information on the operating state of the display apparatus 200 through the provided communication module.

The Wi-Fi module and the Bluetooth module may perform communication by a Wi-Fi method and a Bluetooth method, respectively. When the Wi-Fi module or the Bluetooth module is used, various connection information such as a service set identifier (SSID) and session key may first be transmitted and received, and various information may be transmitted and received after using the connection information to connect in communication.

The wireless communication module, in addition to the above-described communication methods, may include at least one communication chip performing communication according to the various wireless communication standards such as, for example, and without limitation, a ZigBee, a 3rd generation (3G), a 3rd generation partnership project (3GPP), a long term evolution (LTE), LTE advanced (LTE-A), 4th generation (4G), and 5th generation (5G).

Each communication module may include various communication circuitry and be implemented as at least one hardware chip form.

The electronic apparatus 100 may further include a diode, the output end of the first converter 120 may include a first node connected to the first ground and a second node connected to the cathode of the diode. The output end of the second converter 130 may include a third node connected to the second ground and a fourth node connected to the anode of the diode. The diode may prevent and/or reduce the display apparatus 200 from being changed from the first operating state to the second operating state, and the first driving power by the first converter 120 from being discharged to the second converter 130.

As described above, the electronic apparatus 100 may use the switch 140 to provide one of a high voltage first driving power and a low voltage second driving power to the display apparatus 200 through the power interface 110. Accordingly, the thickness of the cable may reduced by reducing the number of wires connected with the power interface 110. The high voltage may be voltage for the display apparatus 200 to operate in the normal mode, and the low voltage may be voltage for the display apparatus 200 to operate in the standby mode. In addition, the high voltage may be a voltage for the display apparatus 200 to operate at a mode requiring more power, and the low voltage may be a voltage for the display apparatus 200 to operate at a mode using only some functions.

In FIG. 3, the second converter 130 has been described as being turned-off when the display apparatus 200 is the first operating state, but this may vary according to the connection state of the switch 140 and the power interface 110.

For example, when the output end of the first converter 120 and the power interface 110 is in a connected state at one end of the switch 140, even if the display apparatus is in a first operating state, the second converter 130 may not be turned-off due to the switch 140 being open. In other words, when the output end of the first converter 120 and the power interface 110 is in a connected state at one end of the switch 140, the second converter 130 may always be in the turned-on state regardless of the operating state of the display apparatus 200. Further, the switch 140 may be turned-off if the display apparatus 200 is in the first operating state, and turned-off if the display apparatus 200 is in the second operating state.

Figure 4:
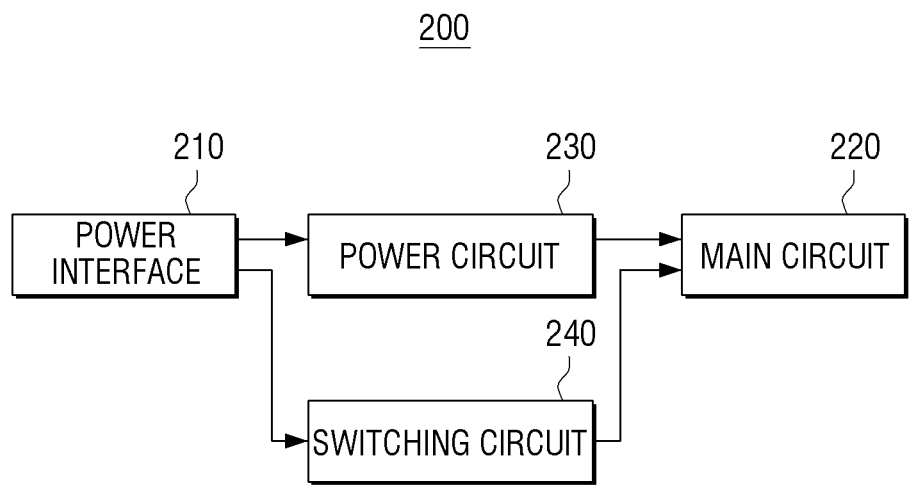
FIG. 4 is a block diagram illustrating an example configuration of a display apparatus according to an embodiment of the disclosure.

FIG. 4 is a block diagram illustrating an example configuration of an example display apparatus 200 according to an embodiment of the disclosure.

Referring to FIG. 4, the display apparatus 200 may include a power interface (e.g., including circuitry) 210, a main circuit 220, a power circuit 230, and a switching circuit 240.

The power interface 210 may include various circuitry and connect with the electronic apparatus 100 through a cable. The display apparatus 200 may supplied with power from the electronic apparatus 100 through the power interface 210 and the cable.

The main circuit 220 may include, for example, a circuit for controlling the display apparatus 200 overall, and may be supplied with power from the power circuit 230 or the switching circuit 240.

The power circuit 230 may be turned-on if the display apparatus 200 is in the first operating state to supply the first driving power provided through the power interface 210 to the main circuit 220, and turned-off if the display apparatus 200 is in the second operating state. The first driving power may be power based on a ground different from an earth ground.

The switching circuit 240 may be turned-off if the display apparatus 200 is in the first operating state and may supply the second driving power provided through the power interface 210 to the main circuit 220 if the display apparatus 200 is in the second operating state. The second driving power may be power based on the earth ground.

The switching circuit 240 may be open between the power interface 210 and the main circuit 220 when the first driving power is provided through the power interface, and closed between the power interface 210 and the main circuit 220 for the second driving power to be provided to the main circuit 220 when the second driving power is provided through the power interface 210.

The switching circuit 240 may be open between the power interface 210 and the main circuit 220 when a signal indicating that the display apparatus 200 is in the first operating state is received from the main circuit 220, and closed between the power interface 210 and the main circuit 220 for the second driving power to be provided to the main circuit 220 when a signal indicating that the display apparatus 200 is in the second operating state is receive from the main circuit 220.

The switching circuit 240 may include, for example, if the driving power provided to the main circuit 220 exceeds a threshold value, a protection circuit blocking the provision of driving power.

The display apparatus 200 may further include a communication interface may include various communication circuitry connected with the electronic apparatus 100, and the main circuit 220 may transmit information on the operating state of the display apparatus 100 to the electronic apparatus 100 through the communication interface. In addition, the main circuit 220 may transmit information on the operating state of the display apparatus 200 to the power circuit 230 and the switching circuit 240.

Because the communication interface of the display apparatus 200 may be the same as or corresponding to the communication interface of the electronic apparatus 100, repetitive descriptions thereof may not be repeated here.

As described above, the display apparatus 200 may operate to correspond to the provided driving power even though the first driving power or the second driving power is provided through the same wire.

The operations of the electronic apparatus 100 and the display apparatus 200 will be described in greater below with reference to various example circuits.

FIGS. 5A, 5B, 5C and 5D are diagrams illustrating example operation of an electronic system 1000 according to an embodiment of the disclosure.

Figure 5A:
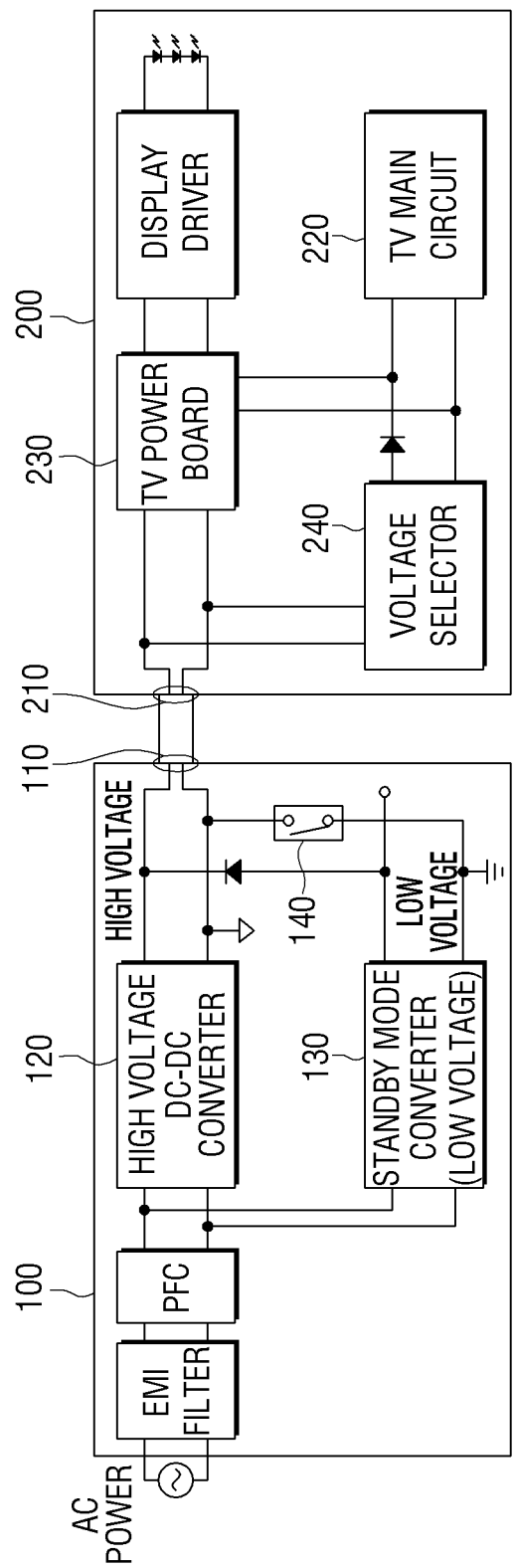
FIG. 5A is a diagram illustrating an example operation of an electronic system according to an embodiment of the disclosure.
Figure 5B:
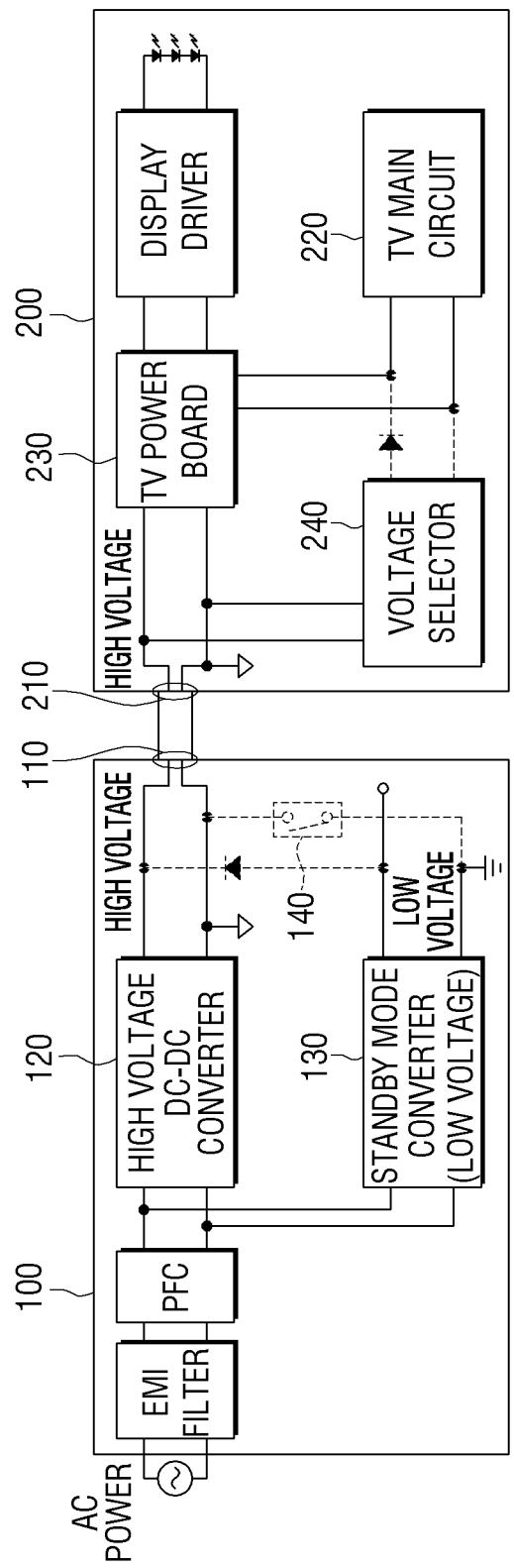
FIG. 5B is a diagram illustrating an example operation of an electronic system according to an embodiment of the disclosure.
Figure 5C:
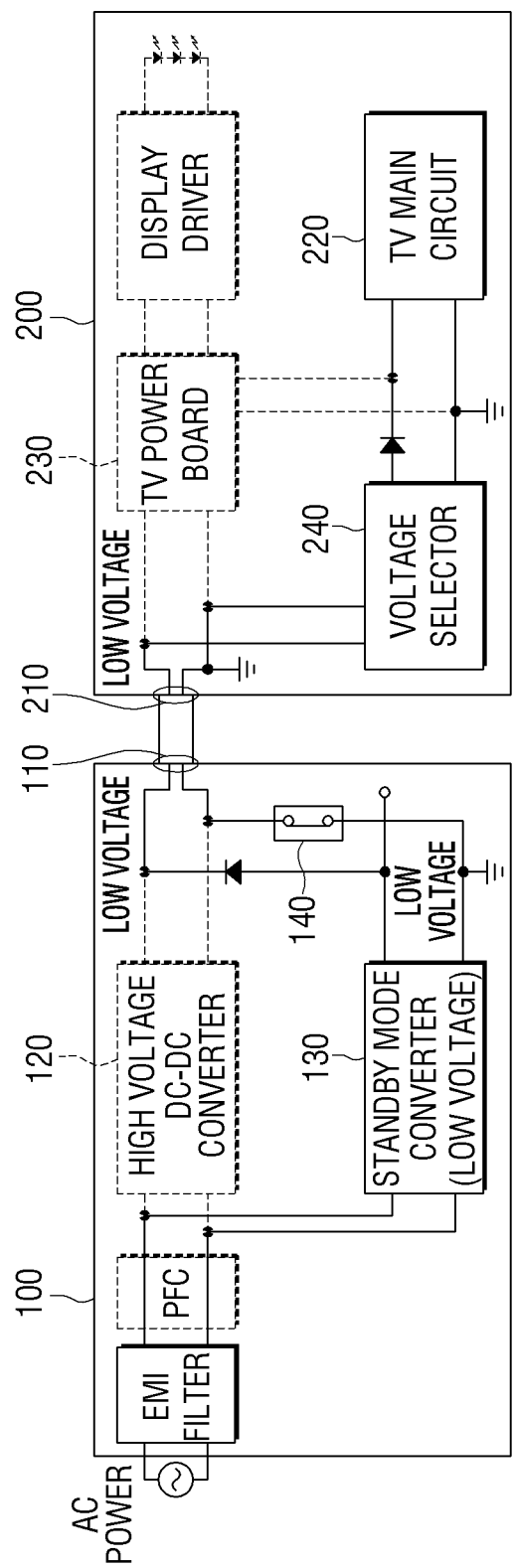
FIG. 5C is a diagram illustrating an example operation of an electronic system according to an embodiment of the disclosure.

FIG. 5A is block diagram illustrating an example connecting relationship of each configuration in the electronic system 100, FIG. 5B is a block diagram illustrating example operation of each configuration when the display apparatus is in the first operating state, and FIG. 5C is a block diagram illustrating example operation of each configuration when the display apparatus 200 is in the second operating state. In FIGS. 5B and 5C, the configuration that is in a turned-on state and a portion with current flowing is illustrated using a solid line, and the configuration that is in a turned-off state and a portion without current flowing is illustrated using a dotted line.

As illustrated in FIG. 5A, the electronic apparatus 100 may include an EMI filter, a PFC circuit, a first converter (e.g., high voltage DC-DC converter 120), a second converter (e.g., standby mode converter (low voltage) 130), a switch 140, and a power interface 110. The first converter 120 may be connected to a ground different from the earth ground, and the second converter 130 may be connected to the earth ground.

In FIG. 5A, although the switch 140 has been illustrated as being connected to a ground node of the output end of the first converter 120 and a ground node of the output end of the second converter 130, this is to highlight the diode, and the switch may be connected to two nodes of the output end of the first converter 120 and two nodes of the output end of the second converter 130.

The display apparatus 200 may include a power interface 210, a main circuit (e.g., TV main circuit 220), a power circuit (e.g., TV power board 230), a switching circuit (e.g., voltage selector 240), and a display driver. The display apparatus 200 may be connected to a ground different from the earth ground. However, the display apparatus 200 may be connected to the earth ground when the second driving power is supplied from the electronic apparatus 100.

As illustrated in FIG. 5B, the display apparatus 200 being in the first operating state, that is a state operating at the normal mode, will be described. In this case, the switch 140 may be open circuited (e.g., open) for the first driving power of the first converter 120 to be supplied to the display apparatus 200 through the power interface 110. Further, because the first driving power is based on the ground different from the earth ground, safety may be secured.

The power circuit 230 and the switching circuit 240 of the display apparatus 200 may be provided with the first driving power through the power interface 210. The power circuit 230 may provide the first driving power by converting to a power required in the main circuit 220 and a display driver. When the first driving power is applied, the switching circuit 240 and the main circuit 220 may be open circuited (e.g., open) therebetween. In other words, the switching circuit 240 may not perform any operation if the first driving power is applied.

In FIG. 5B, the second converter 130 is illustrated as not being turned-off, and in this case, the second converter 130 may be in a state of supplying separate power such as a USB power. However, the embodiment is not limited thereto, and the second converter 130 may be turned-off if the display apparatus 200 is in the first operating state.

As illustrated in FIG. 5C, when the display apparatus 200 is in the second operating state, that is a state operating at the standby mode, the switch 140 may be short circuited (e.g., closed) and the second driving power of the second converter 130 may be supplied to the display apparatus 200 through the power interface 110. When the display apparatus 200 is in the second operating state, the first converter 120 and the PFC circuit may be turned-off. The second driving power may be based on the earth ground, but because the second driving power is a low voltage, safety may be secured.

In order for the first converter 120 to be turned-off and to prevent and/or reduce the first driving power of the first converter 120 from being discharged to the second converter 130, the output end of the first converter 120 and the output end of the second converter 130 may be connected to the diode. Accordingly, damage of the second converter 130 may be prevented and/or reduced.

However, the embodiment is not limited thereto, and if the switch 140 is short circuited (e.g., closed) after the first driving power of the first converter 120 is discharged to a predetermined voltage or less, the diode may be omitted.

The switching circuit 240 of the display apparatus 200 may be provided with the second driving power through the power interface 210. When the second driving power is applied, the switching circuit 240 and the main circuit may be short circuited therebetween, and the second driving power may be provided to the main circuit 220 through the switching circuit 240. Because the display apparatus 200 operates in the second operating state, the power circuit 230 and the display driver may be turned-off.

Figure 5D:
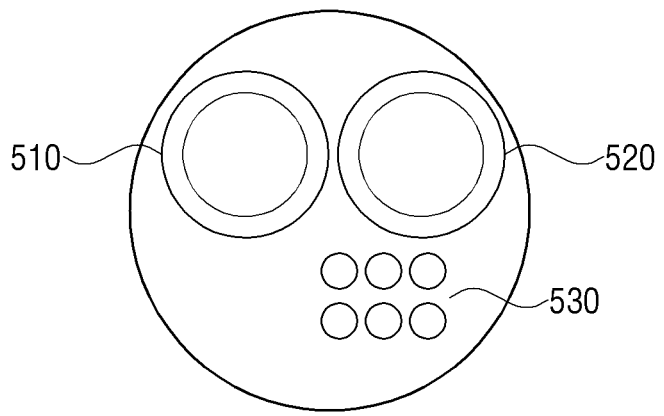
FIG. 5D is a diagram illustrating an example operation of an electronic system according to an embodiment of the disclosure.

Through the above-described operations, the cable may be implemented as illustrated, for example, in FIG. 5D. As illustrated in FIG. 5D, the cable may include a ground line 510, a voltage line 520 transferring driving power, and an optical cable 530.

Conventionally, a voltage line for supplying a first driving power, which is a relatively high voltage, and a voltage line for supplying a second driving power, which is a relatively low voltage, was required. However, according to the disclosure, because the first driving power and the second driving power may be supplied with one voltage line 520, a cable thinner than conventional cables may be realized.

The ground line 510 may be an earth ground or a ground different from the earth ground based on the driving power applied from one of the first driving power or the second driving power.

In FIGS. 5A, 5B and 5C, the switching circuit 240 and the power circuit 230 have been illustrated separately, but the power circuit 230 may include the switching circuit 240 in actual implementation. However, the embodiment is not limited thereto, and the main circuit 220 may also include the switching circuit 240.

Figure 6A:
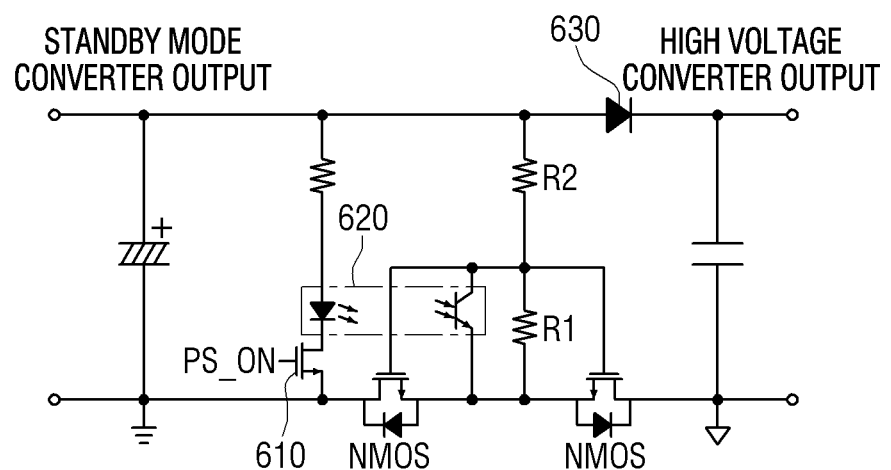
FIG. 6A is a circuit diagram illustrating an example switch according to an embodiment of the disclosure.
Figure 6B:
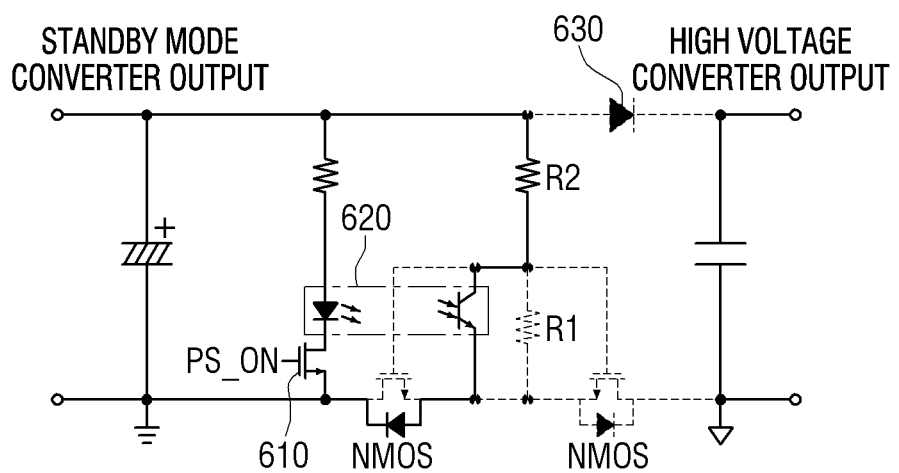
FIG. 6B is a circuit diagram illustrating an example switch according to an embodiment of the disclosure.
Figure 6C:
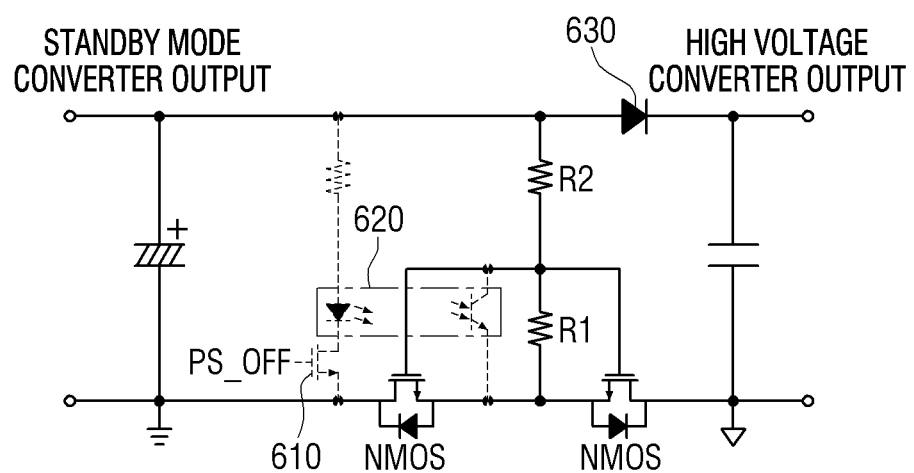
FIG. 6C is a circuit diagram illustrating an example switch according to an embodiment of the disclosure.

FIGS. 6A, 6B and 6C are diagrams illustrating an example switch 140 according to an embodiment of the disclosure.

FIG. 6A illustrates an example connecting relationship of each configuration in the switch 140, FIG. 6B illustrates example operations of each configurations in the switch 140 when the display apparatus 200 is in the first operating state, and FIG. 6C illustrates example operations of each configuration in the switch 140 when the display apparatus 200 is in the second operating state. In FIGS. 6B and 6C, the portion with current flowing is illustrated using a solid line, and the portion without current flowing is illustrated using a dotted line.

As illustrated in FIG. 6A, the switch 140 may include a transistor 610 receiving information on the operating state of the display apparatus 200, a photo coupler 620, a diode 630, a resistance and a n-channel metal oxide semiconductor (NMOS) transistor.

As illustrated in FIG. 6B, if the display apparatus 200 is in the first operating state, a PS_ON signal may be applied to the transistor 610 and the transistor 610 may be turned on. When current flows to a light emitting diode of the photo coupler 620 connected in series with the transistor 610 to emit light, the photo transistor of the photo coupler 620 may be turned on. In this case, current may not flow to a R1 resistance and a gate of the NMOS transistor, and the gate of the NMOS transistor becomes a low state. That is, the NMOS transistor is turned off and the switch 140 may be open circuited. Accordingly, the first driving power may be provided to the display apparatus 200.

In FIG. 6C, if the display apparatus 200 is in the second operating state, a PS_OFF signal may be applied to the transistor 610 to block the transistor 610. In this case, current may not flow to the light emitting diode of the photo coupler 620 connected in series with the transistor 610, and the photo transistor of the photo coupler 620 may also be turned off for the current to flow to the R1 resistance. As the gate of the NMOS transistor becomes a high state, the NMOS transistor may be turned on, and the switch 140 may be short circuited. Accordingly, the second driving power may be provided to the display apparatus 200.

As illustrated in FIGS. 6A, 6B and 6C, the switch 140 may be implemented as a semiconductor device. In this case, the switch may be implemented to a small volume, and although there is no noise, in return a small amount of standby power for turning-on the semiconductor device during the standby mode may be consumed, and because it is not a perfect isolation, the switch may have an impedance of several MΩ and may be rather disadvantageous from a safety aspect.

Figure 7A:
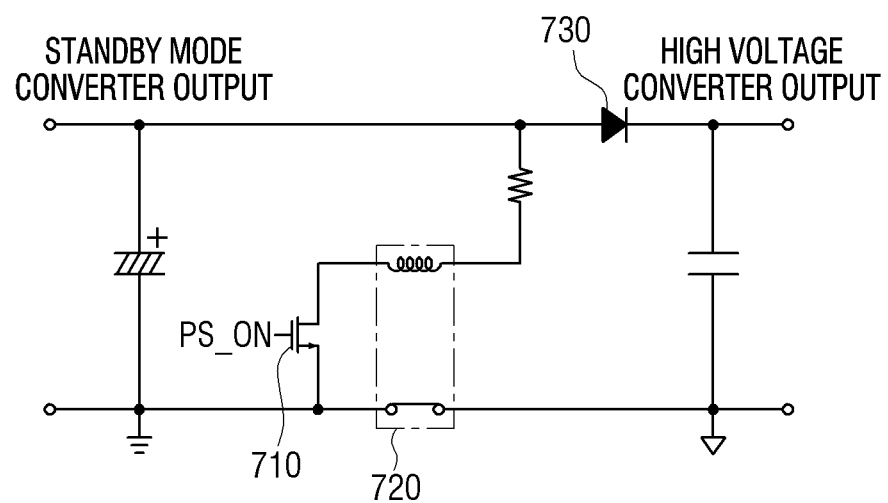
FIG. 7A is a circuit diagram illustrating an example switch according to various embodiments of the disclosure.
Figure 7B:
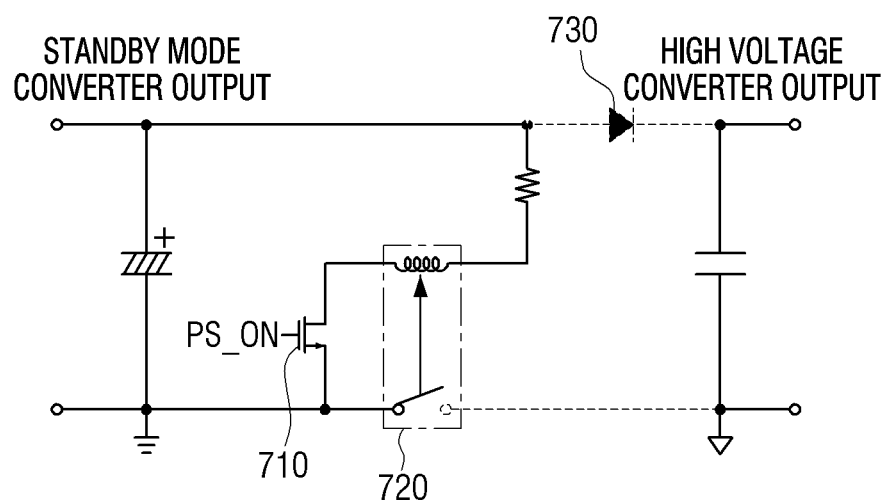
FIG. 7B is a circuit diagram illustrating an example switch according to various embodiments of the disclosure.
Figure 7C:
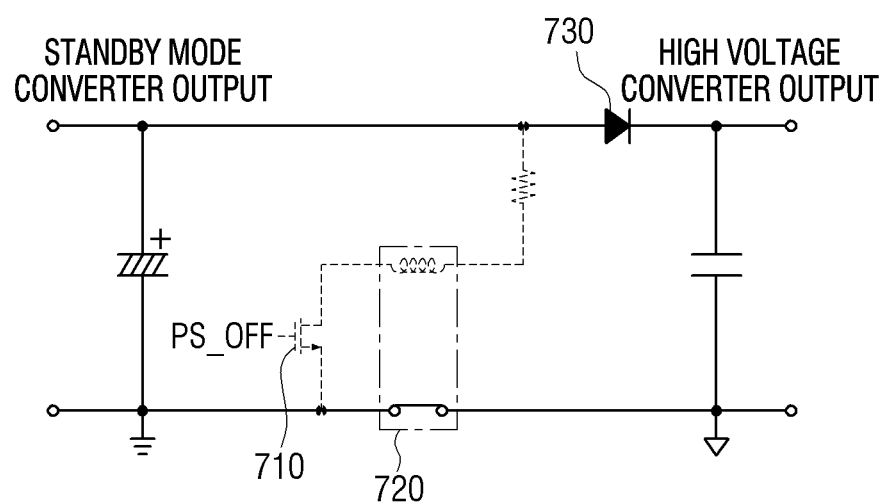
FIG. 7C is a circuit diagram illustrating an example switch according to another embodiment of the disclosure.

FIGS. 7A, 7B and 7C are diagrams illustrating an example switch 140 according to various embodiments of the disclosure.

FIG. 7A illustrates an example connecting relationship of each configuration in the switch 140, FIG. 7B illustrates example operations of each configuration in the switch 140 when the display apparatus 200 is in the first opening state, and FIG. 7C illustrates example operations of each configuration in the switch 140 when the display apparatus 200 is in the second operating state. In FIGS. 7B and 7C, the portion with current flowing is illustrated using a solid line, and the portion without current flowing is illustrated using a dotted line.

As illustrated in FIG. 7A, the switch 140 may include a transistor 710 receiving information on an operating state of the display apparatus 200, a relay switch 720, a diode 730, and resistance.

As illustrated in FIG. 7B, when the display apparatus 200 is in the first operating state, a PS_ON signal may be applied to the transistor 710 and the transistor 710 may be turned on. When current flows to the transistor 610, the relay switch 720 may be open and switch 140 may be open circuited. Accordingly, the first driving power may be provided to the display apparatus 200.

In FIG. 7C, if the display apparatus 200 is in the second operating state, a PS_OFF signal may be applied to the transistor 710 and the transistor 720 may be turned off. In this case, because of current not flowing to the transistor 610, the relay switch 720 may maintain the short circuited (e.g., closed) state, and the switch 140 may also maintain the short circuited state. Accordingly, the second driving power may be provided to the display apparatus 200.

As in FIGS. 7A, 7B and 7C, the switch 140 may, for example, be implemented to a relay device. In this case, because a perfect isolation is possible, the switch may be advantageous in a safety aspect, but noise may be generated when turning-on or turning-off the switch. The relay switch may be structured to be attached during standby mode to eliminate unnecessary power that drives the switch when in standby mode and may turn-off the switch and consume power to turn-off the switch when in normal mode.

FIGS. 8A, 8B, 8C and 8D are diagrams an example switching circuit 240 according to an embodiment of the disclosure.

Figure 8A:
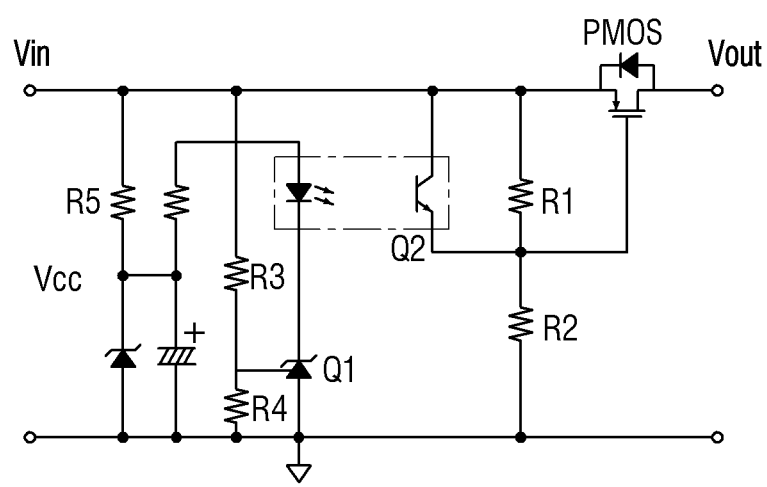
FIG. 8A is a circuit diagram illustrating an example switching circuit according to an embodiment of the disclosure.
Figure 8B:
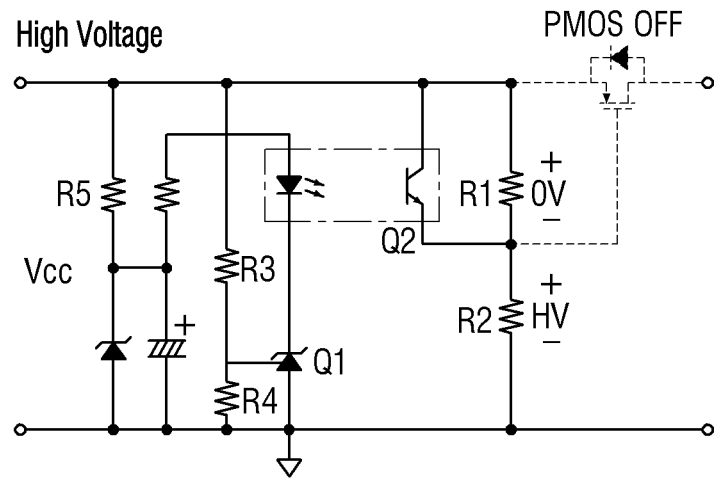
FIG. 8B is a circuit diagram illustrating an example switching circuit according to an embodiment of the disclosure.
Figure 8C:
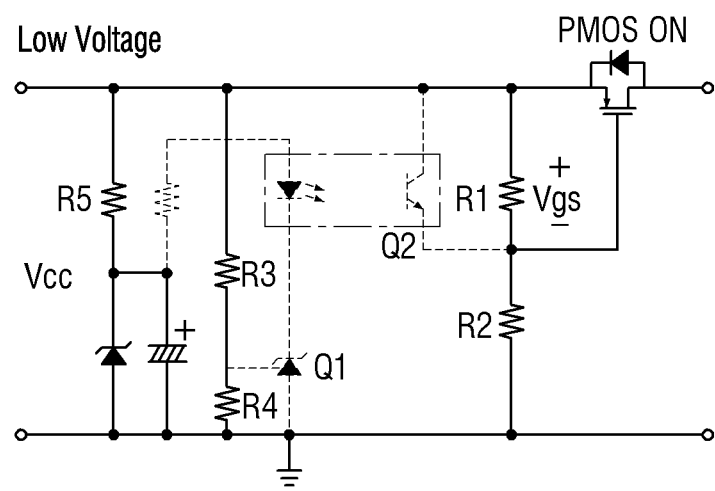
FIG. 8C is a is a diagram illustrating example driving power according to an operating state of FIG. 8B or FIG. 8C, an operating state of the display apparatus, an operating state of the PMOS transistor, and an output power according to an embodiment of the disclosure.

FIG. 8A illustrates an example connecting relationship of each configuration in the switching circuit 240, FIG. 8B illustrates example operations of each configuration in the switching circuit 240 when the display apparatus 200 is in the first operating state, and FIG. 8C illustrates example operations of each configuration in the switching circuit 240 when the display apparatus 200 is in the second operating state. In FIGS. 8B and 8C, the portion with current flowing is illustrated using a solid line, and the portion without current flowing is illustrated in a dotted line.

As illustrated in FIG. 8A, the switching circuit 240 may be provided with a driving voltage (Vin) from the electronic apparatus 100. The switching circuit 240 may include a zener diode for generating driving voltage (Vcc), an electrolytic capacitor, and a R5 resistance. Further, the switching circuit 240 may include a zener diode (Q1) performing a comparator function, an R3 resistance, and an R4 resistance. Further, the switching circuit 240 may include a photo coupler (Q2) performing a switching function, an R1 resistance, an R2 resistance, and a p-channel metal oxide semiconductor (PMOS) transistor.

When the cable is connected to the display apparatus 200, the switching circuit 240 may be maintained at a low voltage until the display apparatus 200 transmits a PS_ON signal to the electronic apparatus 100.

As illustrated in FIG. 8B, when the display apparatus 200 is in the first operating state and a PS_ON signal is applied, the first converter 120 of the electronic apparatus 100 may be turned-on and the driving power (Vin) of the switching circuit 240 may rise. The driving power (Vin) voltage divided by the R3 resistance and the R4 resistance, and the zener diode (Q1) may be turned on if the voltage divided voltage becomes greater than a threshold voltage (Vref), and the PMOS transistor may be turned off because the photo coupler (Q2) is operated. The output power (Vout) may rise together with the driving power (Vin) until the PMOS transistor is turned off. When the PMOS transistor is turned off, the switching circuit 240 and the main circuit 220 may be open circuited therebetween, and in this case, the main circuit 220 may be supplied with the first driving power through the power circuit 230.

Because of current not flowing in the R1 resistance, voltage of the R1 resistance may be 0 V, and the first driving power may be applied to the R2 resistance. Since a high voltage is applied, the R2 resistance may require a sufficiently large value in consideration of the loss.

In FIG. 8C, when the display apparatus 200 is in the second operating state and a PS_OFF signal is applied, the second converter 30 of the electronic apparatus 100 may be turned-on and the driving power (Vin) of the switching circuit 240 may fall. The driving power (Vin) may be voltage divided by the R3 resistance and the R4 resistance, and the zener diode (Q1) may be turned off if the voltage divided voltage becomes less than the threshold voltage (Vref), the PMOS transistor may be turned on because the photo coupler (Q2) is not operated. When the PMOS transistor becomes turned on, the switching circuit 240 and the main circuit 220 may be short circuited therebetween, and in this case, the main circuit 220 may be supplied with the second driving power through the switching circuit 240.

Because the R2 resistance has a sufficiently large value, the R1 resistance may also require a sufficiently large value considering a Vth of the PMOS transistor. As the PMOS transistor is turned on, the output power (Vout) may also rise according to the driving power (Vin). The voltage increase may be proportional to the size of the threshold voltage level, and if the voltage increase is reduced, selecting an appropriate value may be required because the change may influence sensitivity to mode change.

FIG. 8A illustrates a ground, which is not an earth ground. However, as illustrated in FIG. 8C, when the PMOS transistor is turned on and the second driving power is applied, the ground may be changed to the earth ground, which is the ground of the second driving power.

Figure 8D:
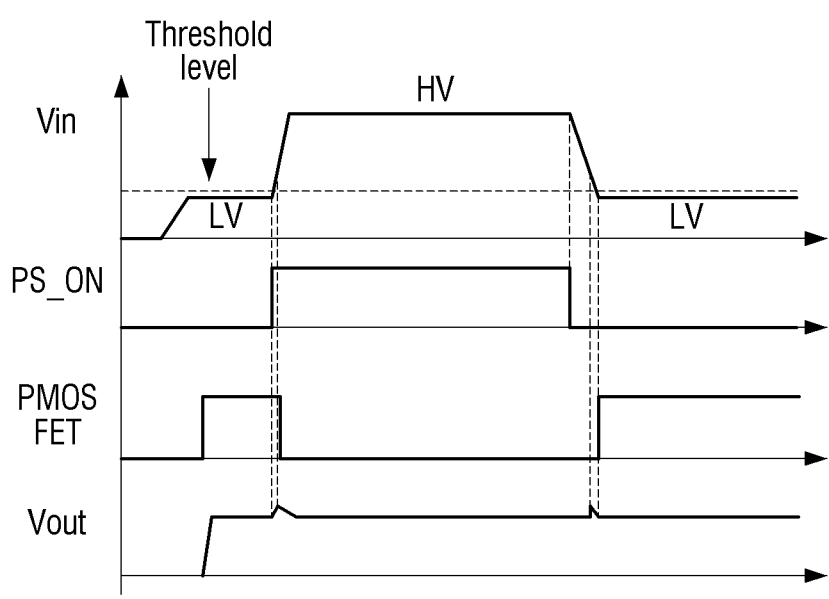
FIG. 8D is a signal diagram of an example switching circuit according to an embodiment of the disclosure.

FIG. 8D is a diagram illustrating example driving power (Vin) according to an operating state of FIG. 8B or FIG. 8C, an operating state (PS_ON) of the display apparatus 200, an operating state of the PMOS transistor, and an output power (Vout).

FIGS. 9A, 9B, 9C and 9D are diagrams illustrating an example switching circuit 240 according to various embodiments of the disclosure.

Figure 9A:
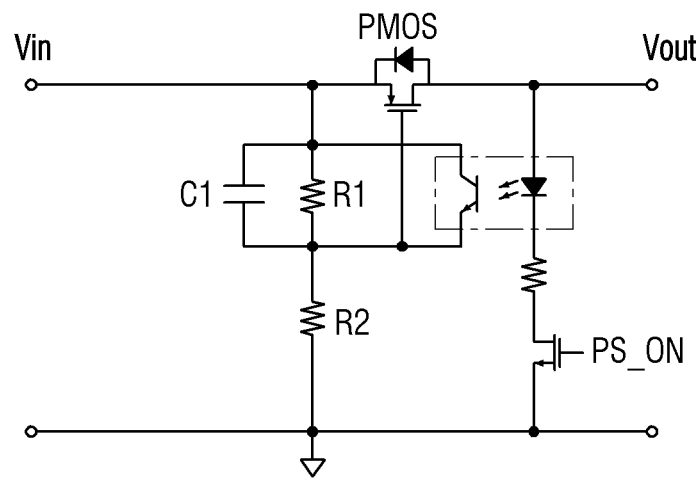
FIG. 9A is a circuit diagram illustrating an example switching circuit according to various embodiments of the disclosure.
Figure 9B:
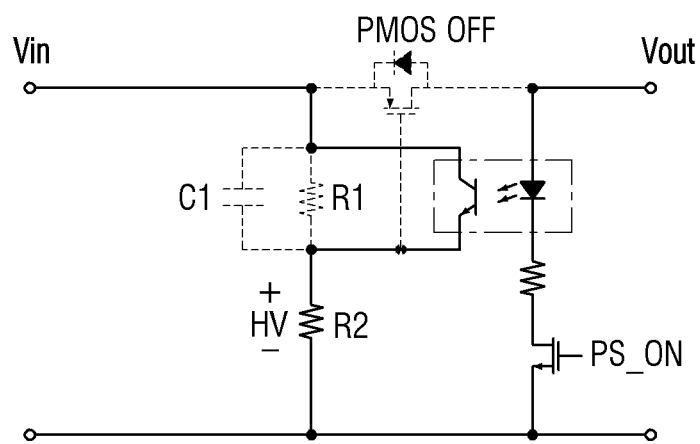
FIG. 9B is a circuit diagram illustrating an example switching circuit according to various embodiments of the disclosure.
Figure 9C:
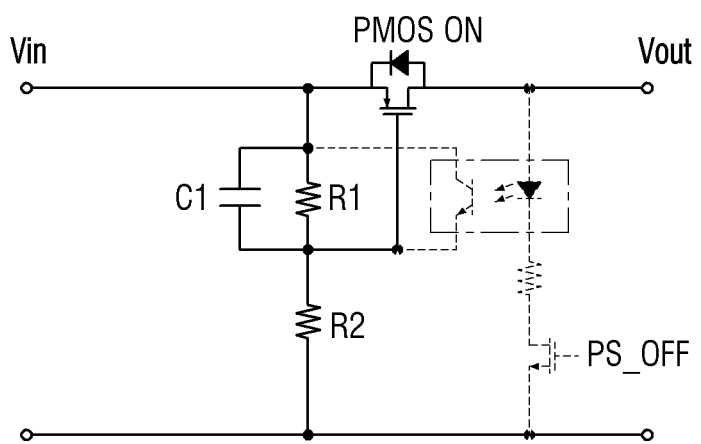
FIG. 9C is a circuit diagram illustrating an example switching circuit according to various embodiments of the disclosure.

FIG. 9A illustrates an example connecting relationship of each configuration in the switching circuit 240, FIG. 9B illustrates example operations of each configuration in the switching circuit 240 when the display apparatus 200 is in the first operating state, and FIG. 9C illustrates example operations of each configuration in the switching circuit 240 when the display apparatus 200 is in the second operating state. In FIGS. 9B and 9C, the portion with current flowing is illustrated using a solid line, and the portion without current flowing is illustrated using a dotted line.

As illustrated in FIG. 9A, the switching circuit 240 may be provided with the driving power (Vin) from the electronic apparatus 100. The switching circuit 240 may include a transistor receiving information on the operating state of the display apparatus 100, a photo coupler, a C1 capacitor, an R1 resistance, an R2 resistance, a PMOS transistor, and the like.

When a cable is connected to the display apparatus 200, the switching circuit 240 may be maintained at low voltage until the display apparatus 200 transmits a PS_ON signal to the electronic apparatus 100.

As illustrated in FIG. 9B, when the display apparatus is in the first operating state and the PS_ON signal is applied, the PMOS transistor may be turned off because the photo coupler is operated. As the PMOS transistor is turned off, the main circuit 220 may be supplied with the first driving power through the power circuit 230. The output power (Vout) may be slightly fall until the power circuit 230 normally operates to provide power to the main circuit 220.

Because of current not flowing in the R1 resistance, voltage of the R1 resistance may be 0 V, and the first driving power may be applied to the R2 resistance. Since a high voltage is applied, the R2 resistance may require a sufficiently large value in consideration of the loss.

As illustrated in FIG. 9C, when the display apparatus 200 is in the second operating state and the PS_OFF signal is applied, the driving power (Vin) may fall. If the PMOS transistor is turned on according to the PS_OFF signal, a threshold delay time may be required because the driving power (Vin) currently decreasing is applied to the output power (Vout). The threshold delay time may be determined by a time constant of the R2 resistance and the C1 capacitor.

If the threshold delay time is too fast, a voltage higher than the output power (Vout) may be applied, and if the threshold delay time is too slow, the output power (Vout) may fall until the PMOS transistor is turned on because of the power consumed by the main circuit 220. Accordingly, an appropriate threshold delay time for the falling output power (Vout) to not reach the minimum operable voltage of the main circuit 220 may be required. Although the time constant may be used, the main circuit 220 may delay the point in time the PS_OFF signal is provided to the switching circuit 240.

Figure 9D:
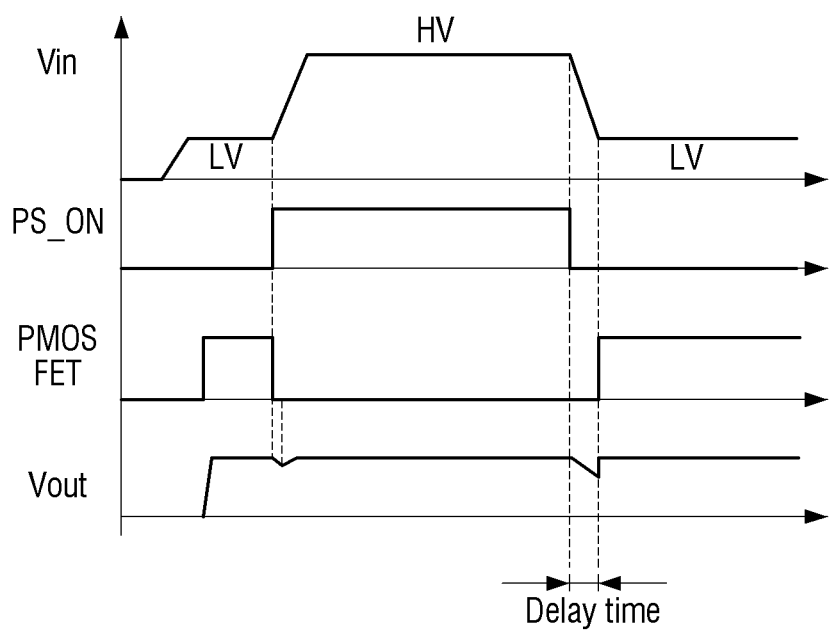
FIG. 9D is a is a diagram illustrating example driving power according to the operating state of FIG. 9B or FIG. 9C, an operating state of the display apparatus, an operating state of the PMOS transistor, and an output power according to various embodiments of the disclosure.

FIG. 9D is a diagram illustrating example driving power (Vin) according to the operating state of FIG. 9B or FIG. 9C, an operating state (PS_ON) of the display apparatus 200, an operating state of the PMOS transistor, and an output power (Vout).

Figure 10A:
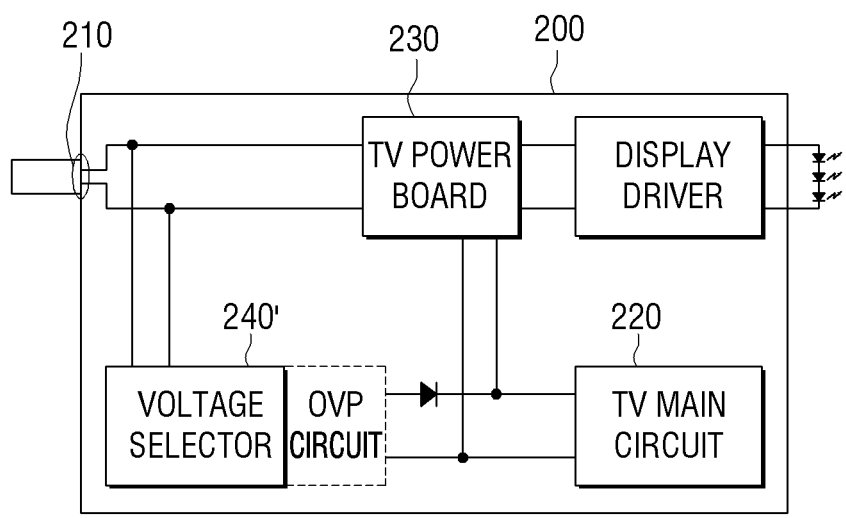
FIG. 10A is a block diagram illustrating an example protection circuit according to various embodiments of the disclosure.
Figure 10B:
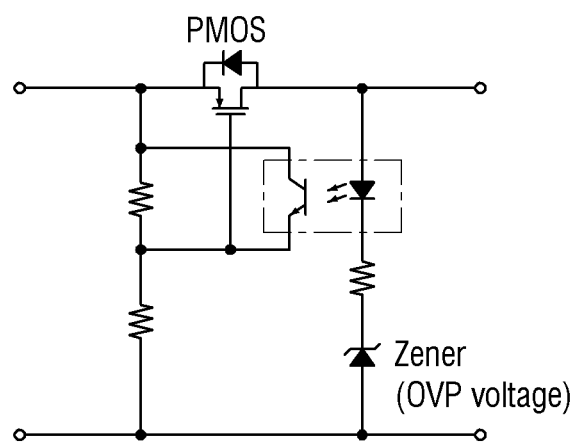
FIG. 10B is a circuit diagram illustrating an example protection circuit according to various embodiments of the disclosure.
Figure 10C:
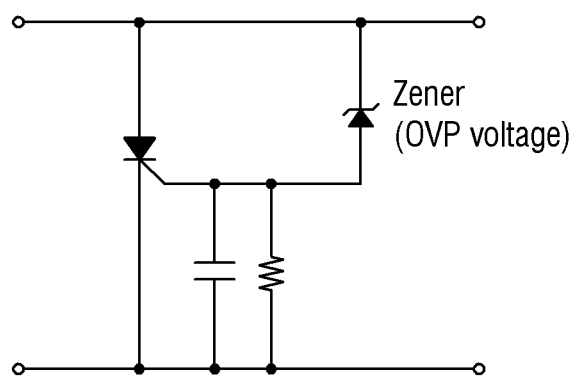
FIG. 10C is a circuit diagram illustrating an example protection circuit according to various embodiments of the disclosure.

FIGS. 10A, 10B and 10C are diagrams illustrating an example protection circuit according to various embodiments of the disclosure.

As illustrated in FIG. 10A, if the driving power provide to the main circuit 220 exceeds a threshold value, the switching circuit 240' (e.g., voltage selector) may include a protection circuit (e.g., over voltage protection (OVP)) that blocks the provision of driving power. For example, as illustrated in FIG. 10A, the switching circuit 240' may include the protection circuit connected in series to the output end of the switching circuit 240'.

The protection circuit may prevent and/or reduce the main circuit 220 from being damaged by the first driving power of a high voltage when the PMOS transistor of the switching circuit 240' is damaged and no long capable of performing voltage selection operation.

As illustrated in FIG. 10B, when a high voltage is applied to the zener diode, the protection circuit may be operated through the method of the photo coupler operating to block the PMOS transistor.

As illustrated in FIG. 10C, when a high voltage is applied to the zener diode, the protection circuit may electrically connect a silicon controlled rectifier (SCR) as a signal is applied to a gate terminal of the SCR. Based on the SCR being turned on, a potential of the main circuit 220 is maintained at zero potential and damage of the main circuit 220 may be prevented and/or reduced.

FIGS. 11A, 11B, 11C and 11D are diagrams illustrating an example configuration of an electronic apparatus 100 and an example configuration of a display apparatus 200 according to various embodiments of the disclosure.

Figure 11A:
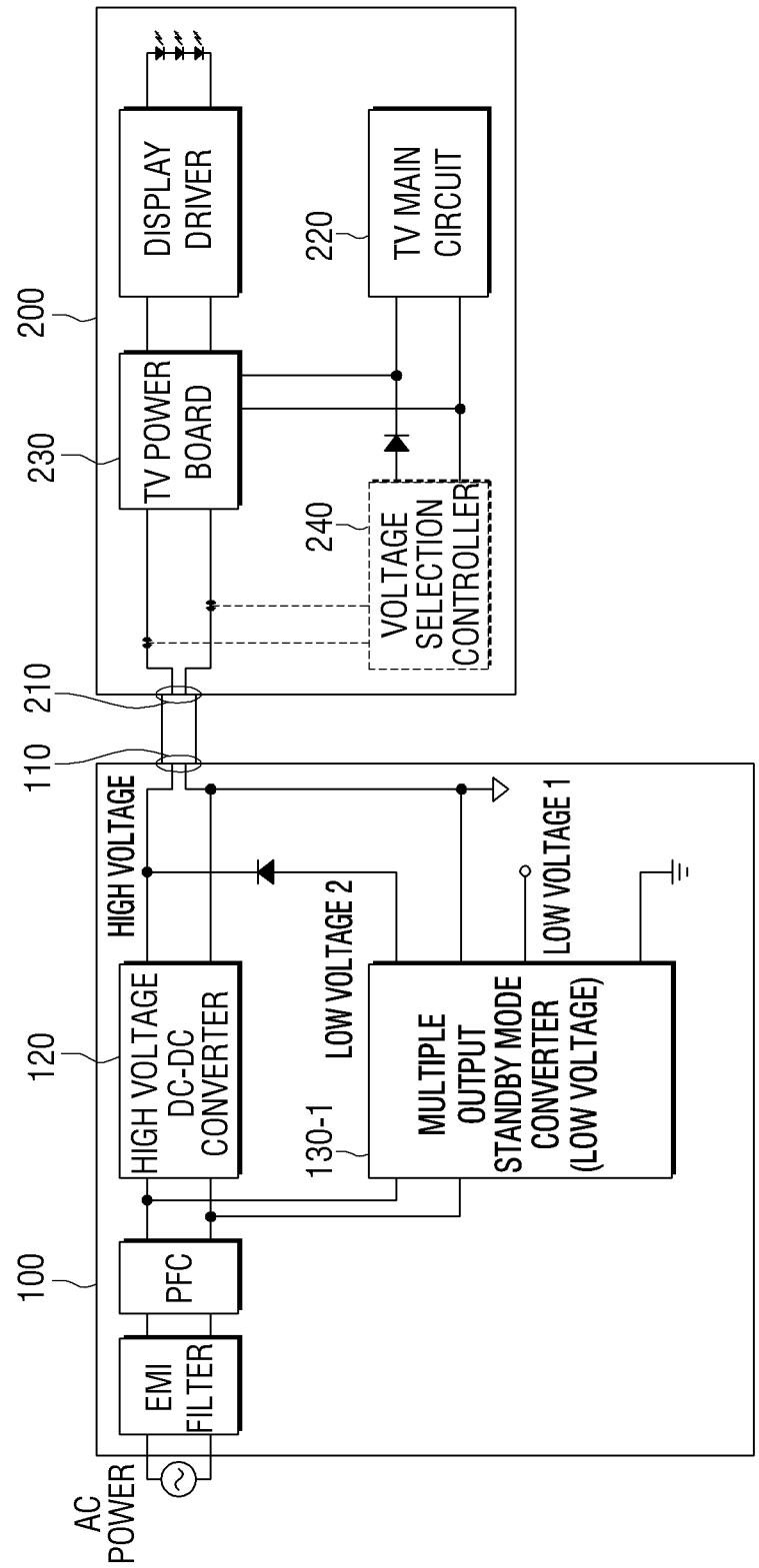
FIG. 11A is a block diagram illustrating an example configuration of an electronic apparatus and an example configuration of a display apparatus according to various embodiments of the disclosure.
Figure 11B:
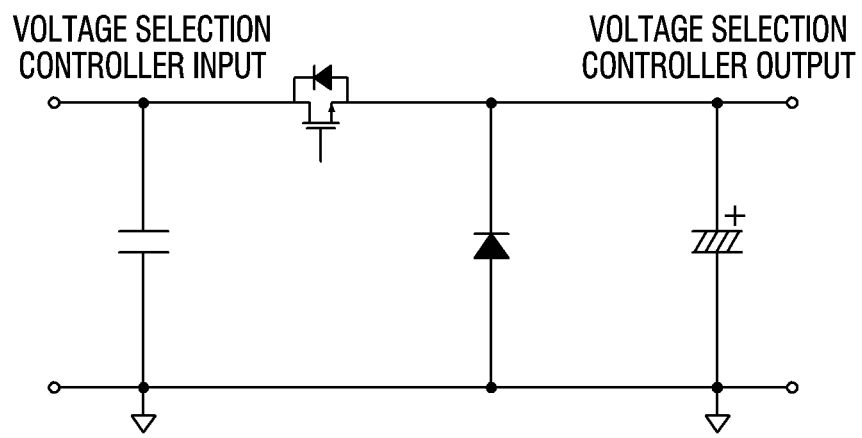
FIG. 11B is a circuit diagram illustrating an example configuration of an electronic apparatus and an example configuration of a display apparatus according to various embodiments of the disclosure.
Figure 11C:
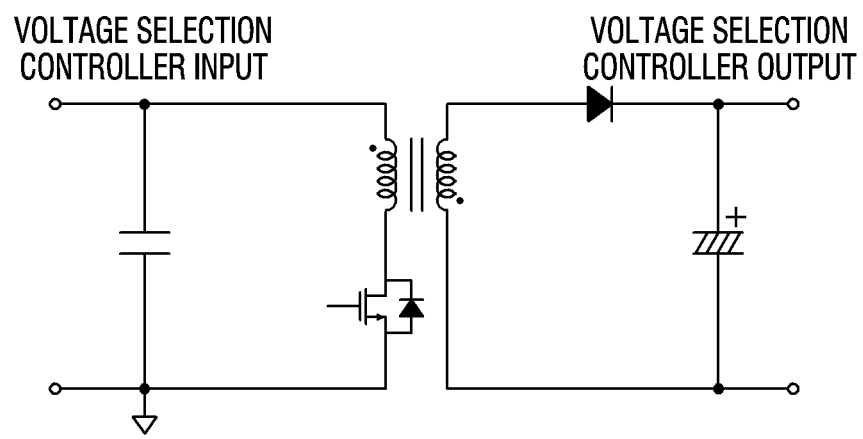
FIG. 11C is a circuit diagram illustrating an example configuration of an electronic apparatus and an example configuration of a display apparatus according to various embodiments of the disclosure.
Figure 11D:
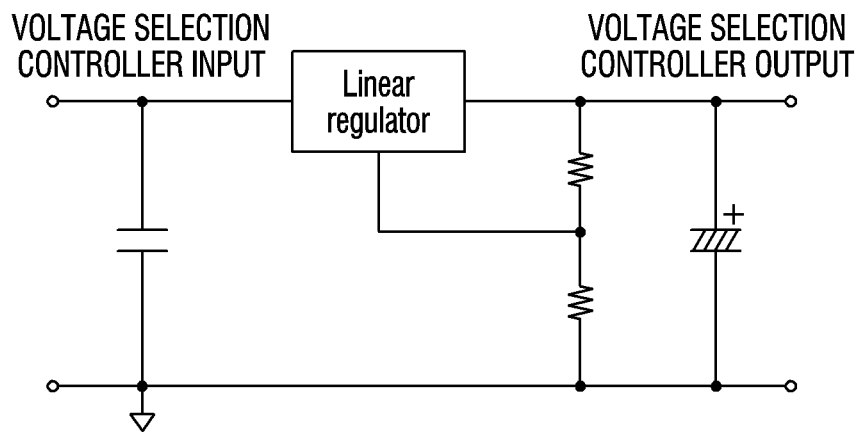
FIG. 11D is a circuit diagram illustrating an example configuration of an electronic apparatus and an example configuration of a display apparatus according to various embodiments of the disclosure.

As illustrated in FIG. 11A, the electronic apparatus 100 may include a multiple output standby mode converter 130-1 rather than the second converter 130 of FIG. 5A. The multiple output standby mode converter 130-1 may include a transformer with multi-windings, and because the transformer may always disconnect the ground, the switch 140 of FIG. 5A may be replaced with the transformer. However, if there is a mode where the voltage of the first converter 120 becomes lower than the voltage of a standby mode converter 130-1 during a normal mode operation, a switch for preventing and/or reducing power from being transferred through the output of the standby mode converter 130-1 may be required.

The standby mode converter 130-1 may generate a low voltage 1 required inside of the electronic apparatus 100 and a low voltage 2 having a ground different from the low voltage 1. The ground of the low voltage 2 may be the same as the ground of the first converter 120.

If a feedback control for regulating low voltage 1 is performed, regulation properties of low voltage 2 may be deteriorated. Accordingly, in order to apply a regulated voltage to the main circuit 220, the switching circuit 240 may be substituted with a DC-DC converter or a linear regulator as in FIGS. 11B, 11C and 11D and not an ON/OFF circuit.

The DC-DC converter may be implemented as a simple non-isolation type converter such as a buck converter, and may be implemented as an isolation type converter using a transformer such as a flyback. For example, when implemented to the isolation type converter, because the input voltage is not applied as the output voltage as is due to the transformer, the protection circuit may be removed. The converter substituting the switching circuit 240 should be able to operate normally even though an input widely ranging from the low voltage 2 to up to the high voltage of the standby mode is received.

When a light-load efficiency of the main circuit 220 is sufficiently efficient, the switching circuit 240 may be substituted to a converter inside the power circuit 230. However, the power circuit 230 should also be able to operate to a wide range from the low voltage 2 to up to the high voltage.

Figure 12:
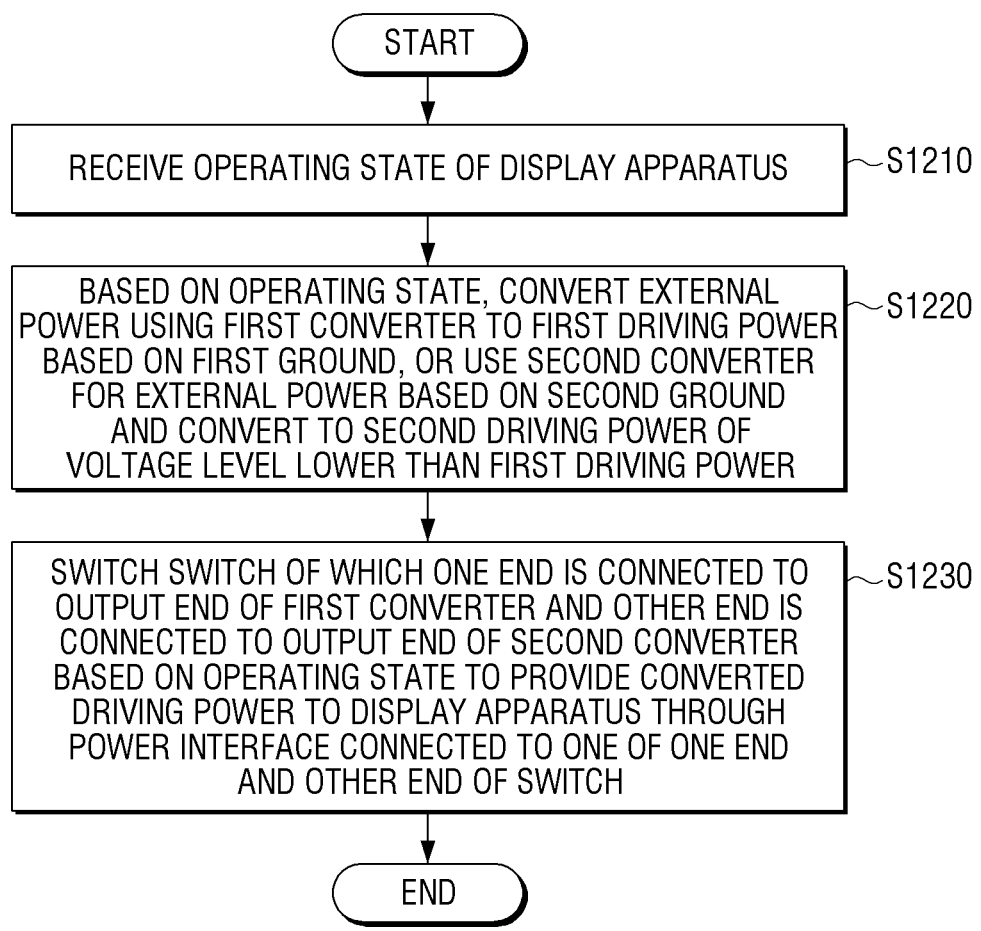
FIG. 12 is a flowchart illustrating an example method of controlling an electronic apparatus according to an embodiment of the disclosure.

FIG. 12 is a flowchart illustrating an example method of controlling an electronic apparatus according to an embodiment of the disclosure.

The operating state of the display apparatus may be received (S1210). Based on the operating state, the external power may be converted to the first driving power based on the first ground using the first converter, or the external power may be based on the second ground and converted to the second driving power of a voltage level lower than the first driving power using the second converter (S1220). The switch of which the one end may be connected to the output end of the first converter and the other end may be connected to the output end of the second converter may be switched based on the operating state, and the converted driving power may be supplied to the display apparatus through the power interface connected to one of the one end and the other end of the switch (S1230).

The converting (S1220) may include outputting the first driving power by turning-on the first converter when the display apparatus is in the first operating state, turning-off the second converter, turning-off the first converter when the display apparatus is in the second operating state, and outputting the second driving power by turning-on the second converter.

The supplying (S1230) may include open circuiting the switch for the first driving power to be supplied to the display apparatus through the power interface when the display apparatus is in the first operating state, and short circuiting the switch for the second driving power to be supplied to the display apparatus through the power interface when the display apparatus is in the second operating state.

The first operating state may be a state with the display apparatus operating in the normal mode, and the second operating state may be a state with the display apparatus operating at the standby mode.

The supplying (S1230) may include the cathode being connected to the output end of the first converter, and the anode blocking the first driving power from being supplied to the second converter through the diode connected to the output end of the second converter.

The second ground may be the earth ground, and the first ground may be a ground different from the earth ground.

The receiving information on the operating state of the display apparatus through the communication interface may be further included.

Figure 13:
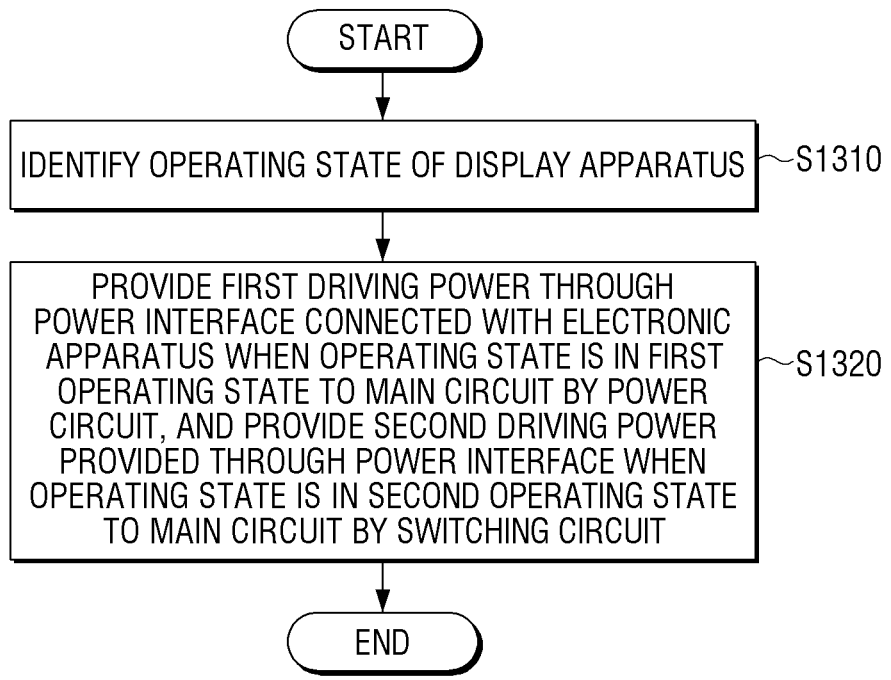
FIG. 13 is a flowchart illustrating an example method of controlling a display apparatus according to an embodiment of the disclosure.

FIG. 13 is a flowchart illustrating an example method of controlling a display apparatus according to an embodiment of the disclosure.

An operating state of the display apparatus may be identified (S1310). The first driving power provided through the power interface connected with the electronic apparatus may be supplied to the main circuit by the power circuit if the operating state is in the first operating state, and the second driving power provided through the power interface may be supplied to the main circuit by the switching circuit if the operating state is in the second operating state (S1320).

Transmitting information on the operating state of the display apparatus through the communication interface connected with the electronic apparatus to the electronic apparatus may be further included.

The supplying (S1320) may include open circuiting between the power interface and the main circuit when the first driving power is provided through the power interface, and short circuiting between the power interface and the main circuit for the second driving power to be provided to the main circuit when the second driving power is provided through the power interface.

In addition, the supplying (S1320) may include open circuiting between the power interface and the main circuit if a signal indicating that the display apparatus is in the first operating state is received from the main circuit, and short circuiting between the power interface and the main circuit for the second driving power to be provided to the main circuit if a signal indicating that the display apparatus is in the second operating state is received from the main circuit.

If the driving power provided to the main circuit exceeds a threshold value, blocking the provision of driving power using the protection circuit may be further included.

Further, the second driving power may be power based on the earth ground, and the first driving power may be power based on a ground different from the earth ground.

According to the various embodiments, the electronic apparatus may use one power cable to provide power of a high voltage or a low voltage to the display apparatus, and the power cable connecting the electronic apparatus and the display apparatus may be realized to be thinner.

In addition, each of the elements (e.g., a module or a program) according to the various embodiments described above may include a single entity or a plurality of entities, and some sub-elements of the abovementioned sub-elements may be omitted, or another sub-element may be further included in various embodiments. Alternatively or additionally, some elements (e.g., modules or programs) may be integrated into one entity to perform the same or similar functions performed by each respective element prior to integration. The operations performed by a module, a program, or other element, in accordance with the various embodiments, may be performed sequentially, in a parallel, repetitively, or in a heuristically manner, or at least some operations may be performed in a different order, omitted, or may further include a different operations.

While the disclosure has been illustrated and described with reference to various example embodiments thereof, the it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus, comprising:
a single power cable configured to provide power to a display apparatus;
a first converter comprising circuitry configured to convert an external power to a first driving power based on a first ground;
a second converter comprising circuitry configured to convert the external power to a second driving power, based on a second ground, the second driving power having a voltage level less than a voltage level of the first driving power; and a switch having one end connected to an output end of the first converter and a second end connected to an output end of the second converter, wherein the switch is configured to be switched to supply one of the first driving power and the second driving power to the display apparatus through a same wire in the single power cable based on an operating state of the display apparatus, wherein the first converter is configured to: turn on based on the display apparatus being in a first operating state; output the first driving power; and turn off based on the display apparatus being in a second operating state, wherein the second converter is configured to: turn off based on the display apparatus being in the first operating state; turn on based on the display apparatus being in the second operating state; and output the second driving power, and wherein the switch is configured to be open circuited to supply the first driving power to the display apparatus through the single power cable based on the display apparatus being in the first operating state, and is configured to be short circuited to supply the second driving power to the display apparatus through the single power cable based on the display apparatus being in the second operating state.

2. The electronic apparatus of claim 1, wherein the first operating state is a state in which the display apparatus operates in a normal mode, and wherein the second operating state is a state in which the display apparatus operates in a standby mode.

3. The electronic apparatus of claim 1, further comprising: a diode, wherein the output end of the first converter comprises a first node connected to the first ground and a second node connected to a cathode of the diode, and wherein the output end of the second converter comprises a third node connected to the second ground and a fourth node connected to an anode of the diode.

4. The electronic apparatus of claim 1, wherein the second ground is an earth ground, and wherein the first ground is a ground different from the earth ground.

5. The electronic apparatus of claim 1, further comprising:
a communication interface comprising circuitry connected with the display apparatus, wherein the electronic apparatus is configured to receive information on an operating state of the display apparatus through the communication interface.

6. A display apparatus, comprising:
a display driver;
a single power cable comprising circuitry connected with an electronic apparatus configured to provide a first driving power or a second driving power to the display apparatus through a same wire in the single power cable;
a communication interface, comprising communication circuitry, connected with the electronic apparatus;
a main circuit configured to control operation of the display apparatus;
a power circuit coupled to the single power cable and configured to: turn on, based on the display apparatus being in a first operating state, to supply the first driving power provided through the single power cable to the main circuit and the display driver, and turn off based on the display apparatus being in a second operating state; and a switching circuit coupled to the single power cable and configured to turn off based on the display apparatus being in the first operating state and to supply the second driving power provided through the single power cable to the main circuit based on the display apparatus being in a second operating state, wherein the main circuit is configured to transmit information on an operating state of the display apparatus to the electronic apparatus through the communication interface, wherein the switching circuit is configured to be open between the single power cable and the main circuit based on the first driving power being provided through the single power cable, and to be closed between the single power cable and the main circuit to supply second driving power to the main circuit based on the second driving power being provided through the single power cable.

7. The display apparatus of claim 6,
wherein the switching circuit is configured to open between the single power cable and the main circuit based on a signal indicating the display apparatus is in the first operating state being received from the main circuit, and to close between the single power cable and the main circuit for the second driving power to be provided to the main circuit based on a signal indicating the display apparatus is in the second driving state being received from the main circuit.

8. The display apparatus of claim 6, wherein the switching circuit comprises a protection circuit configured to block the provision of the driving power based on the driving power provided to the main circuit exceeding a threshold value.

9. The display apparatus of claim 6, wherein the second driving power is a power based on an earth ground, and wherein the first driving power is a power based on a ground different from the earth ground.

10. A method of controlling an electronic apparatus, the method comprising:
receiving an operating state of a display apparatus;
based on the operating state, converting an external power to a first driving power based on a first ground using a first converter or converting the external power to a second driving power, based on a second ground, the second driving power having a voltage level lower than a voltage level of the first driving power using a second converter;
switching a switch based on the operating state to supply the converted driving power to the display apparatus through a single power cable configured to provide power to a display apparatus connected to the switch;
opening the switch to supply the first driving power to the display apparatus through the power interface based on the display apparatus being in a first operating state; and
closing the switch to supply the second driving power to the display apparatus through the power interface based on the display apparatus being in a second operating state.

11. The method of claim 10, wherein the converting comprises:

turning on the first converter based on the display apparatus being in a first operating state to output the first driving power, and turning off the second converter; and turning off the first converter based on the display apparatus being in a second operating state, and turning on the second converter to output the second driving power.

12. The method of claim 10, wherein the first driving power and the second driving power are provided through a same wire in the single power cable.

13. The method of claim 10, wherein the first operating state is a state in which the display apparatus operates in a normal mode, and wherein the second operating state is a state in which the display apparatus operates in a standby mode.

14. The method of claim 10, wherein the supplying comprises:

connecting a cathode of a diode to an output end of the first converter, and blocking the first driving power from being supplied to the second converter via an anode of a diode connected to an output end of the second converter.

15. The method of claim 10, wherein the second ground is an earth ground, and wherein the first ground is a ground different from the earth ground.

16. The method of claim 10, further comprising:

receiving information on an operating state of the display apparatus through a communication interface.

* * * * *